United States Patent
Shook et al.

(10) Patent No.: US 9,720,707 B1
(45) Date of Patent: Aug. 1, 2017

(54) GENERATING A SET OF USER INTERFACES

(71) Applicant: Accenture Global Solutions Limited, Dublin (IE)

(72) Inventors: Ellyn J. Shook, Eden Praire, MN (US); Rahul Varma, New York, NY (US); Nathan M. Boaz, Atlanta, GA (US); Susan M. Charnaux, Washington, DC (US); Randall R. Wandmacher, Macomb, MI (US); Kush K. Jhawar, Shorthills, NJ (US); Shelby L. Kan, Davie, FL (US); Monica A. LaRosa, Algonquin, IL (US); Tanarra Schneider, Chicago, IL (US); Kristen M. Nagel, Zionsville, IN (US); Kelly A. Harris, Terrace Park, OH (US); Deepashree Basu, Bangalore (IN); Rajiv Chandran, Bangalore (IN); Danielle L. Logan, Wilmington, DE (US); Josh Siebert, Chicago, IL (US); Daniel A. Schocke, McHenry, IL (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/380,865

(22) Filed: Dec. 15, 2016

(51) Int. Cl.
*G06F 17/00* (2006.01)
*G06F 9/44* (2006.01)
(Continued)

(52) U.S. Cl.
CPC ............ *G06F 9/4443* (2013.01); *G06N 5/04* (2013.01); *G06N 7/005* (2013.01); *G06N 99/005* (2013.01)

(58) Field of Classification Search
CPC ......... G06F 17/30554; G06F 17/30867; G06F 17/30958; G06F 17/30598; G06F 3/04842
See application file for complete search history.

(56) References Cited

U.S. PATENT DOCUMENTS

| 7,991,641 B2 | 8/2011 | Vegliante et al. |
| 8,086,482 B2 | 12/2011 | Silvera et al. |

(Continued)

FOREIGN PATENT DOCUMENTS

| CN | 1484182 A | 3/2004 |
| WO | WO 01/63517 A1 | 8/2001 |
| WO | WO 2012/153342 A2 | 11/2012 |

*Primary Examiner* — Truong Vo
(74) *Attorney, Agent, or Firm* — Harrity & Harrity, LLP

(57) ABSTRACT

A device may communicate with a first server to obtain first information regarding a plurality of groups of entities. The device may process the first information to generate a data model relating to attributes of the plurality of groups of entities. The device may communicate with a second server to obtain second information regarding a particular group of entities. The device may process the second information using the data model to identify a set of recommendations relating to the particular group of entities. The device may select a particular recommendation, of the set of recommendations, based on a corresponding score of the set of scores. The device may generate a user interface including the particular recommendation based on selecting the particular recommendation. The device may communicate with a plurality of client devices to cause the particular recommendation to be provided for display.

20 Claims, 13 Drawing Sheets

(51) Int. Cl.
    *G06N 7/00*     (2006.01)
    *G06N 5/04*     (2006.01)
    *G06N 99/00*     (2010.01)

(56) References Cited

U.S. PATENT DOCUMENTS

| | | |
|---|---|---|
| 8,352,311 B2 | 1/2013 | Twyman |
| 2011/0814786 | 7/2011 | Roman Stoica et al. |
| 2012/0084349 A1* | 4/2012 | Lee .................. G06Q 30/02 709/203 |
| 2015/0181271 A1* | 6/2015 | Onno ................ H04N 21/2668 725/34 |

\* cited by examiner

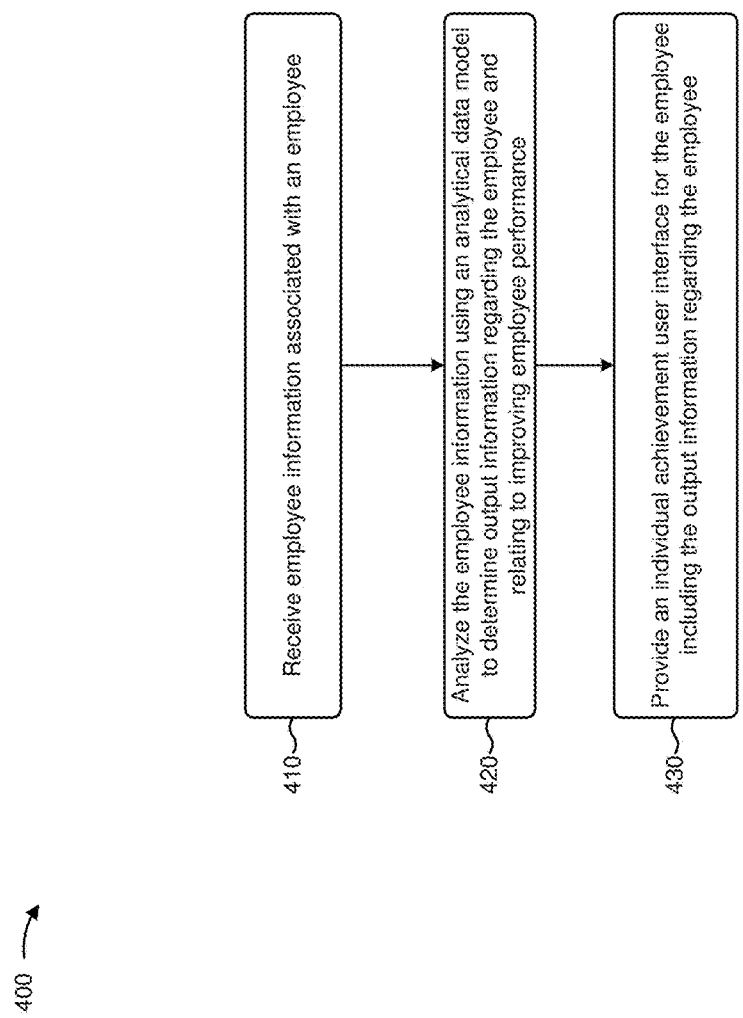

Coaching For Team1

Suggested Conversation Starters:
- Upcoming team priorities realignment
- Team1 received great feedback from the client
- Team1 could improve if execution skill is added
- Team1 includes multiple great communicators
- Team Action Plan To Discuss: Improving engagement with increased volunteering opportunities and performance bonuses Provide Feedback Based On Individual Talent Discussion:

FIG. 7C

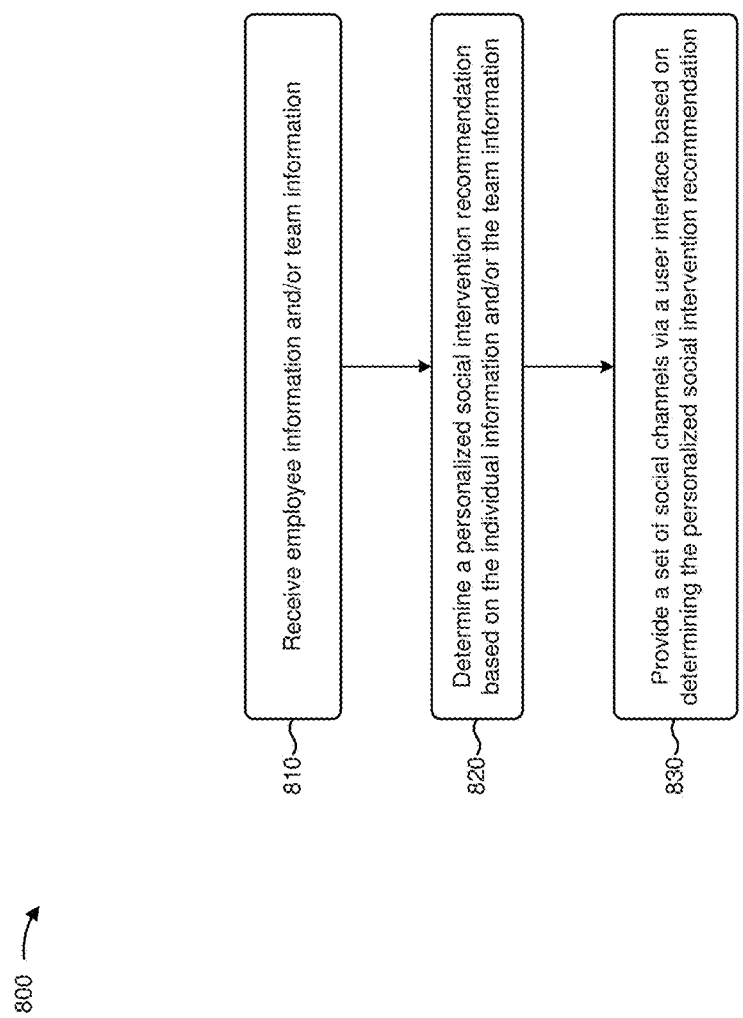

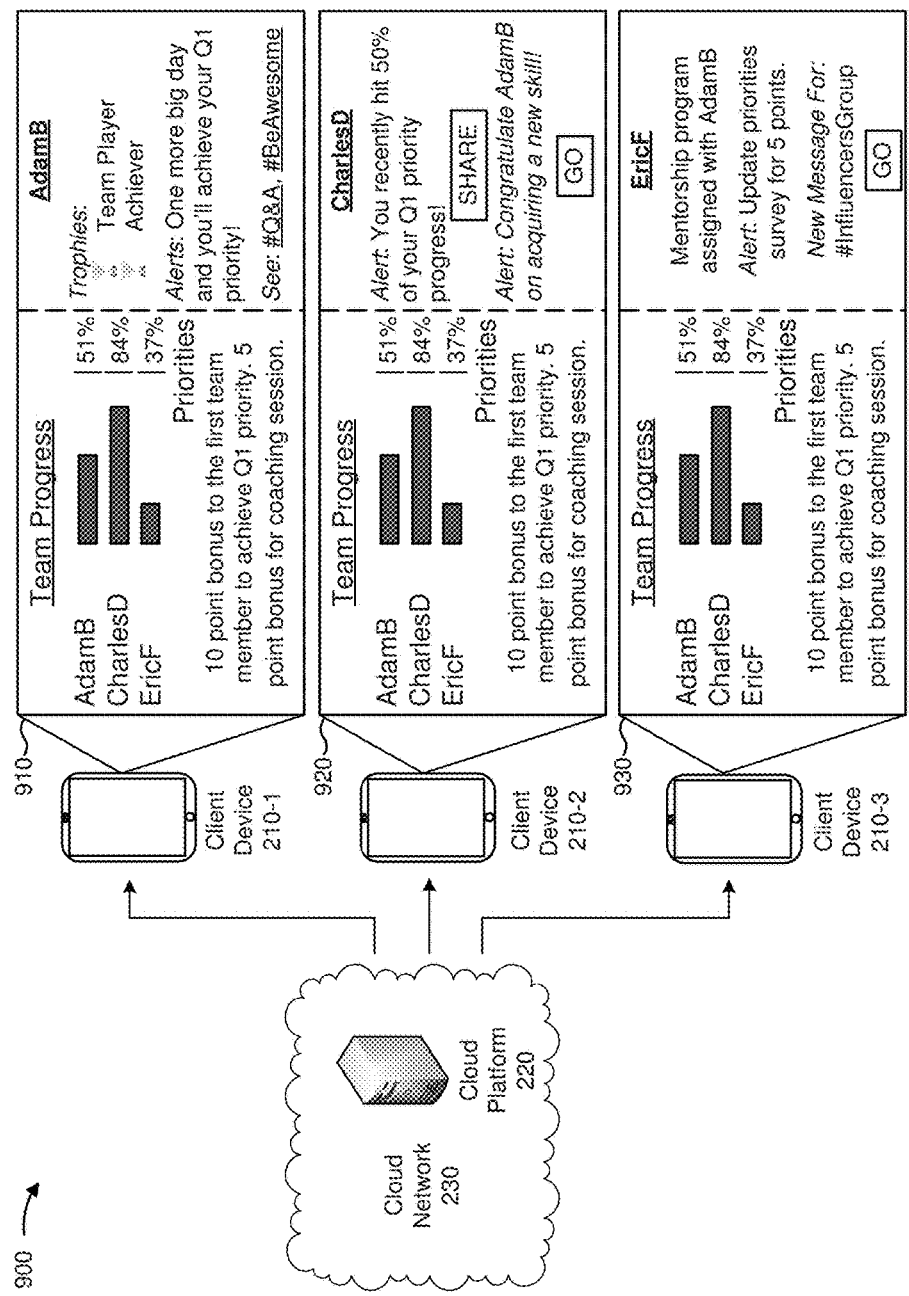

GENERATING A SET OF USER INTERFACES

BACKGROUND

An employee's representative (e.g., a human resources manager, a business leader, career counselor, or a supervisor) at an organization may periodically evaluate the employee of the organization, such as on a quarterly basis, a yearly basis, or the like to understand the achievements and/or potential of the employee. The representative may review and discuss an employee's self-reflection, feedback for the employee, achievement of metrics (e.g., sales figures), or the like. The representative may determine whether the employee has satisfied a set of goals of the role and organization, such as a sales goal, a client feedback goal, or the like. Based on determining whether the employee has satisfied the set of goals of the company, the representative may determine whether to promote the employee, provide a new leadership opportunity, alter a reward scheme for the employee, or take another employment action.

SUMMARY

According to some possible implementations, a device may include one or more processors. The one or more processors may communicate with a first server to obtain first information regarding a set of groups of entities. The first information may be stored by a set of data structures associated with the first server. The one or more processors may process the first information to generate a data model relating to attributes of the set of groups of entities. The one or more processors may communicate with a second server to obtain second information regarding a particular group of entities. The one or more processors may process the second information using the data model to identify a set of recommendations relating to the particular group of entities. The set of recommendations may relate to attributes of the set of groups of entities and one or more attributes of the particular group of entities. The set of recommendations may be associated with a set of scores. The one or more processors may select a particular recommendation, of the set of recommendations, based on a corresponding score of the set of scores. The one or more processors may generate a user interface including the particular recommendation based on selecting the particular recommendation. The one or more processors may communicate with a set of client devices to cause the particular recommendation to be provided for display. The set of client devices may be selected based on the set of client devices being determined to be associated with the particular group of entities.

According to some possible implementations, a method may include receiving, by a cloud computing device, first employee information for a set of employees of an organization. The method may include generating, by the cloud computing device, an analytical data model based on the first employee information for the set of employees of the organization. The analytical data model may relate to a set of skills, a set of priorities, and a set of engagement levels that correspond to performance by a team of employees. The method may include receiving, by the cloud computing device, second employee information for a particular team of employees of the organization. The method may include determining, by the cloud computing device, team information for the particular team based on the second employee information for the particular team. The team information may identify a set of team skills, a set of team priorities, and a team engagement level for the particular team. The method may include processing, by the cloud computing device, the team information using the analytical data model to identify a set of recommendations for the team. The method may include generating, by the device, a user interface based on processing the team information to identify the set of recommendations. The user interface may include information identifying the set of recommendations. The method may include providing, by the device, the user interface for display via a client device associated with a particular employee of the particular team.

According to some possible implementations, a non-transitory computer-readable medium storing instructions, the instructions may include one or more instructions that, when executed by one or more processors, may cause the one or more processors to receive employee information for a set of employees of a team. The one or more instructions, when executed by one or more processors, may cause the one or more processors to identify, based on a set of skills, a set of priorities, and a set of engagement levels included in the employee information and associated with the set of employees of the team, team information for the team. The team information may include a set of attributes of the team. The set of attributes of the team may include a group of team skills, a group of team priorities, and a team engagement level. The one or more instructions, when executed by one or more processors, may cause the one or more processors to process the team information to identify a recommendation relating to improving one or more attributes of the set of attributes of the team. The one or more instructions, when executed by one or more processors, may cause the one or more processors to provide a user interface based on processing the team information to identify the recommendation for the team. The user interface may include information identifying the team information. The user interface may include information identifying a portion of the employee information. The user interface may include information identifying a team action plan relating to the recommendation.

BRIEF DESCRIPTION OF THE DRAWINGS

FIG. 4 is a flow chart of an example process for providing a user interface to enable performance achievement for an employee of an organization;

FIGS. 7A-7C are diagrams of an example implementation relating to the example process shown in FIG. 6;

FIG. 8 is a flow chart of an example process for providing social channels to assist in performance achievement for a set of employees of an organization; and FIG. 9 is a diagram of an example implementation relating to the example process shown in FIG. 8.

DETAILED DESCRIPTION

Figure 1:
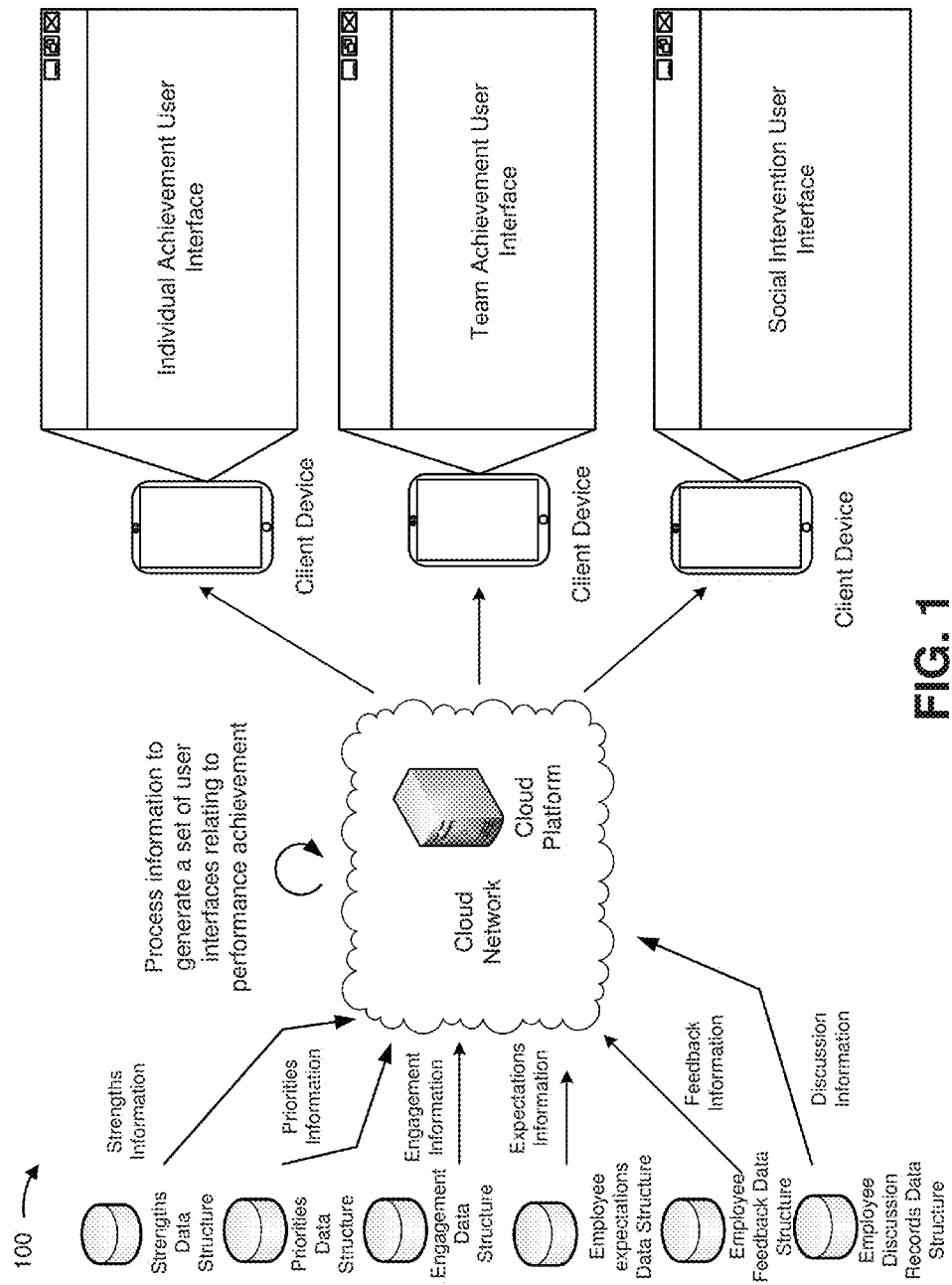
FIG. 1 is a diagram of an overview of an example implementation described herein.

The following detailed description of example implementations refers to the accompanying drawings. The same reference numbers in different drawings may identify the same or similar elements.

To perform performance management for an employer, an employee's representative (e.g., a human resources manager, a business leader, a supervisor, a career counselor, or the like) at an organization may determine a set of goals for a set of employees, such as a monthly goal, a quarterly goal, a yearly goal, or the like. For example, the representative may determine that an employee is to satisfy a goal relating to sales, a goal relating to customer feedback, a goal relating to hours worked, or the like. The representative may periodically perform a performance review of the employee to determine whether the employee has satisfied the goal. For example, the representative may determine that the employee has satisfied a sales goal, and may recommend the employee for a reward for the employee, a promotion, or the like.

However, backward looking performance evaluation based on goals may result in employees failing to achieve an improved level of performance (e.g., a threshold level of performance that is improved relative to a previous level of performance) for the organization. For example, an employee may be informed at an evaluation that the employee has not received a threshold level of customer feedback, and may be demoted or fired without the employee having been made aware that the customer feedback that the employee was receiving was unsatisfactory. Moreover, the employee may lack an understanding of attributes that can be adopted by the employee to achieve a threshold level of performance desired by the organization.

Implementations, described herein, provide a forward looking individual achievement user interface to provide information to an employee that can assist the employee in achieving the improved level (e.g., the threshold level) of performance and/or achievement of a set of personal career goals. For example, implementations described herein may result in improved performance metrics (e.g., sales, customer satisfaction, accuracy), improved delivery metrics (e.g., code written, tasks completed, trouble tickets processed, turnaround time), higher quality, enhanced client relationships, improved average daily rate (e.g., how much a client can be charged for a task), or the like. Moreover, based on assisting the employee in achieving the threshold level of performance, the individual achievement user interface may obviate a need for excessive employee monitoring, thereby reducing a utilization of computing resources associated with monitoring employees of an organization. Furthermore, based on improving a level of performance of the employee, a utilization of computing resources associated with completing a task, reviewing the task, and/or revising errors in the task may be reduced relative to when an employee does not achieve the threshold level of performance.

An employee may be a member of a team of multiple employees in an organization, such as a sales team, a client management team, or the like. A team may have a unique combination of multiple strengths and may require engagement by each employee of the team to achieve a threshold level of team achievement. Managers may assess an employee based on individual metrics regarding the employee, such as sales metrics, customer feedback metrics, production metrics, error metrics, or the like. However, evaluating an employee based on individual metrics may fail to account for the employee's complete contribution to the team. For example, although an employee may fail to satisfy a threshold relating to an individual metric, the employee may enable other employees of the team to satisfy a threshold relating to a team metric. Moreover, evaluating each individual employee of the team may fail to account for the interaction of each individual employee with other employees of the team in causing team success or team failure. Furthermore, a manager who is focused on evaluating individual members of a team may fail to provide recommendations to improve team effectiveness and cause the team to satisfy a threshold level of performance achievement.

Implementations, described herein, provide a team achievement user interface to analyze information regarding a team of employees of an organization and provide one or more recommendations to enable achievement of an improved level (e.g., to a threshold level) of performance for the team of employees of the organization, thereby ensuring growth of the team of employees. Moreover, the team achievement user interface may provide information identifying strengths of individual team members and a contribution of individual strengths to team strengths to ensure that a team can leverage each team member's individual strengths in order to best assign work and complete tasks. Furthermore, the team achievement user interface may provide recommendations relating to an action plan to improve overall team engagement. In this way, team engagement and achievement may be improved, thereby reducing a utilization of computing resources associated with managing a team, completing team tasks, and/or revising errors in team projects.

Each employee of a team may have different personal goals that each employee hopes to achieve. For example, a particular employee may have a personal sales goal, a personal production goal, a personal promotion goal, or the like. Although the team may work together to attempt to achieve a known team goal, a lack of transparency in individual goals may result in an employee of the team failing to receive assistance, mentorship, or the like from other employees of the team in achieving a particular individual goal. This may result in employees failing to achieve job satisfaction relating to individual goals. Moreover, a failure to utilize a user interface providing information may reduce an effectiveness of providing the user interface.

Implementations, described herein, identify a personalized social intervention including providing a set of social channels relating to improving transparency of goals, communication, and utilization of an individual achievement user interface or a team achievement user interface. Moreover, based on including gamification techniques with the personalized social intervention, implementations described herein may increase utilization of one or more user interfaces and/or an application of recommendations provided via the one or more user interfaces, thereby increasing an effectiveness of the one or more user interfaces in improving performance.

In this way, employee satisfaction may be improved based on improving employee performance and achieving career goals, thereby reducing a rate of attrition and reducing an amount of computing resources that are associated with training and/or identifying replacement employees. Furthermore, based on improving employee performance, a quality of projects completed by a team of employees may be improved, thereby reducing a utilization of computing resources associated with completing the project, testing the project, debugging the project, or the like.

FIG. 1 is a diagram of an overview of an example implementation 100 described herein. As shown in FIG. 1, example implementation 100 may include a set of data structures, a cloud network, a cloud platform, and a set of client devices.

As further shown in FIG. 1, the cloud platform may receive information from the set of data structures. For example, the cloud platform may receive strengths or skills information from a strengths data structure. Strengths or skills information may include information identifying a particular strength of an employee, such as a communication strength, a networking strength, an expertise strength, or the like. For example, the cloud platform may provide a user interface identifying a questionnaire regarding a set of skills or strengths that an employee may have, a set of tasks completed by an employee (e.g., from which the cloud platform may determine skills or strengths that an employee may have), or the like. In this case, the cloud platform may receive a result of the questionnaire indicating a task (e.g., from which the cloud platform may determine that the employee may possess a communication skill or strength), a skill or strength (e.g., a self-identification of a communication skill, etc.), or the like, and may store the result of the questionnaire via the strengths data structure, via a skills data structure, or the like.

Similarly, the cloud platform may receive priorities information from a priorities data structure. The priorities information may include information identifying a set of goals of a particular employee, a set of goals for a team of employees, or the like. For example, when a team of employees are assigned to a particular task, the cloud platform may identify a set of goals relating to completion of the particular task and may store information identifying the set of goals via the priorities data structure. Additionally, or alternatively, the cloud platform may receive priorities information identifying a ranking of multiple priorities, such as a ranking relating to a preference regarding achieving a set of goals or the like. Additionally, or alternatively, the cloud platform may determine priorities information based on an order with which a set of tasks are completed, an amount of time that an employee indicates is allocated to each of the set of tasks, or the like.

Similarly, the cloud platform may receive engagement information from an engagement data structure. The engagement information may refer to a connection of a team of employees to a particular task, to a particular team, or the like. For example, the cloud platform may utilize data regarding employees to determine a level of engagement, which may correspond to an employee attrition rate, an employee satisfaction score, a rate at which clients are retained, or the like. For example, the cloud platform may determine that a first team is relatively highly engaged, resulting in a relatively low likelihood of employee attrition. In some implementations, the cloud platform may determine employee analytics to determine a metric relating to individual engagement and subsequently determine one or more recommendations for the employee. In some implementations, the cloud platform may determine engagement of an employee based on monitoring completion of one or more tasks. In some implementations, cloud platform may determine engagement of the employee based on monitoring utilization of one or more user interfaces, such as utilization of a chat platform to discuss employee priorities, utilization of a gamification module, or the like.

Additionally, or alternatively, the cloud platform may receive information from other data sources. For example, the cloud platform may receive expectations information regarding employee expectations from an employee expectations data structure, feedback information regarding employee feedback from an employee feedback data structure, employee discussion records regarding employee discussions (e.g., records regarding counseling discussions, such as peer coaching sessions, supervisor coaching sessions, supervisee coaching sessions, etc., talent discussions, or the like) from an employee discussions records data structure, or the like.

The cloud platform may process the information received from the set of data structures. For example, the cloud platform may process the information to determine attributes of a set of employees associated with a threshold level of performance achievement. An attribute may refer to a particular strength, a particular priority, a level of engagement, or the like. In this case, the cloud platform may identify one or more employees associated with a first threshold level of performance achievement, and may generate a recommendation relating to causing the one or more employees to adopt the one or more attributes to satisfy a second level of performance achievement (e.g., a higher level of performance achievement). For example, the cloud platform may identify a recommendation relating to training an employee for a particular strength, a recommendation relating to realigning one or more priorities of the particular employee, a recommendation relating to increasing a level of engagement of the particular employee, a recommendation relating to realigning a work or task assignment of the particular employee (e.g., to ensure that the employee is working on a task that aligns with short term goals and/or long term goals of both the employee and the employer), or the like. In this way, the cloud platform may identify recommendations associated with increasing individual achievement, thereby improving employee satisfaction, retention, or the like relative to another technique for performance management.

Additionally, or alternatively, the cloud platform may process the information to generate a recommendation relating to a peer coaching session or another type of coaching session (e.g., a supervisor coaching session, a supervisee coaching session, a team coaching session, a mentor coaching session, a manager coaching session, etc.). For example, the cloud platform may recommend that the employee and another employee engage in a peer coaching session to discuss one or more attributes that can be adopted by the employee, to discuss one or more priorities of the employee, or the like. In this case, the cloud platform may automatically perform a set of response actions, such as causing information to be displayed in the individual achievement user interface identifying a set of topics for discussion in the peer coaching session, causing a calendar entry to be created for the peer coaching session, transmitting an alert to another client device used by the other employee to alert the other employee regarding the peer coaching session, or the like.

Additionally, or alternatively, the cloud platform may process the information to determine team strength information, team priorities information, and/or team engagement information based on strengths or skills information, priorities information, and/or engagement information regarding a set of employees. In this case, the cloud platform may generate a set of recommended actions or activities for a team based on the strengths that exist for the employees and the set of strengths of the team. Similarly, the cloud platform may determine a set of priorities for the team based on individual priorities for employees of the team, collective goals set for the team, or the like. Similarly, the cloud platform may determine a level of engagement for the team. For example, the cloud platform may analyze strengths information and/or skills information, as well as other data, such as data (e.g., numerical data, questionnaire responses, or the like) regarding employee absenteeism, employee attrition, employee satisfaction, employee performance, or the like to determine a collective level of engagement for the team. In this case, the cloud platform may generate a recommendation relating to improving team engagement, such as a recommendation relating to training, compensation, team priorities, team coaching, or the like. In this way, the cloud platform improves team achievement, thereby increasing a likelihood of team completion of a particular task and reducing a utilization of computing resources associated with completion of the particular task relative to performing employee management based only on individual employees.

Additionally, or alternatively, the cloud platform may process the information to determine a personalized social intervention recommendation for the employee and/or the team of employees based on an engagement need, a coaching need, or the like. For example, the cloud platform may identify a set of personalized alerts relating to improving employee engagement or improving a likelihood of employee utilization of a particular user interface. Similarly, the cloud platform may determine a set of personalized social communication channels that are to be provided for display to an employee to improve communication between the employee and a set of other employees of an organization. Similarly, the cloud platform may determine a set of personalized gamification modules that are to be provided for display to the employee. In this way, the cloud platform provides a personalized aspect of a user interface to improve performance achievement of an individual employee or a group of employees.

As further shown in FIG. 1, the cloud platform may generate a set of user interfaces based on processing the information. For example, the cloud platform may provide, for display via a first client device, an individual achievement user interface. The individual achievement user interface may include information associated with identifying strengths of an employee, priorities of the employee, engagement of the employee (or engagement of a team that includes the employee), or the like. For example, the cloud platform may provide information identifying attributes of employees satisfying a threshold level of performance achievement (or employees who are determined to be growing and/or improving a level of performance achievement), and a set of recommendations to cause the employee to adopt one or more of the attributes. Additionally, or alternatively, the cloud platform may provide a set of training recommendations, a set of role recommendations, a set of coaching recommendations, or the like.

As further shown in FIG. 1, the cloud platform may provide, for display via a second client device, a team achievement user interface. The team achievement user interface may include information associated with results of a survey or questionnaire of a set of team members, such as an engagement level of the set of team members, a trend in the engagement level over time, or the like. Additionally, or alternatively, the cloud platform may provide, for display in the team achievement user interface, a team action plan identifying a set of recommendations relating to team roles, team activities, team coaching, team staffing, or the like to improve team engagement, and thereby, team achievement. Additionally, or alternatively, the cloud platform may provide, for display in the team achievement user interface, recommended actions and/or activities to facilitate a set of team discussions, such as providing enablement content to support a team strengths discussion.

As further shown in FIG. 1, the cloud platform may provide, for display via a third client device, a social intervention user interface. The social intervention user interface may include a set of modules that may be included in another user interface to utilize gamification, communication, and/or social sharing techniques to improve employee performance, team achievement, organizational transparency, or the like. For example, the cloud platform may provide a set of user interface elements to permit an employee to share information identifying a set of personal priorities, and may direct information identifying the set of personal priorities to a set of other employees determined to be in positions to help the employee complete a set of tasks relating to the set of personal priorities. As an example, the cloud platform may receive information indicating that a particular employee desires to reach a management level position, may identify a set of potential stakeholders (e.g., a mentor for the employee, a supervisor to recommend a promotion, or a peer to help the employee improve achievement on a particular task), may provide a set of alerts to the set of potential stakeholders identifying the desire of the particular employee and/or a set of actions to assist the particular employee (e.g., a mentoring session, a goal-setting session, or a new work assignment), and may establish a chat module to connect the particular employee and the set of potential stakeholders. Additionally, or alternatively, the cloud platform may utilize gamification strategies to encourage monitoring of team progress between employees of a team and/or between multiple teams to improve performance, to manage an organizational culture, or the like.

In this way, the cloud platform improves employee management for an organization, thereby increasing employee morale, employee performance, and/or team achievement. Moreover, based on improving organizational employee management, the cloud platform improves a quality of employee work product, thereby reducing a utilization of computing resources associated with error checking, testing, and/or validation for employee work product.

As indicated above, FIG. 1 is provided merely as an example. Other examples are possible and may differ from what was described with regard to FIG. 1.

Figure 2:
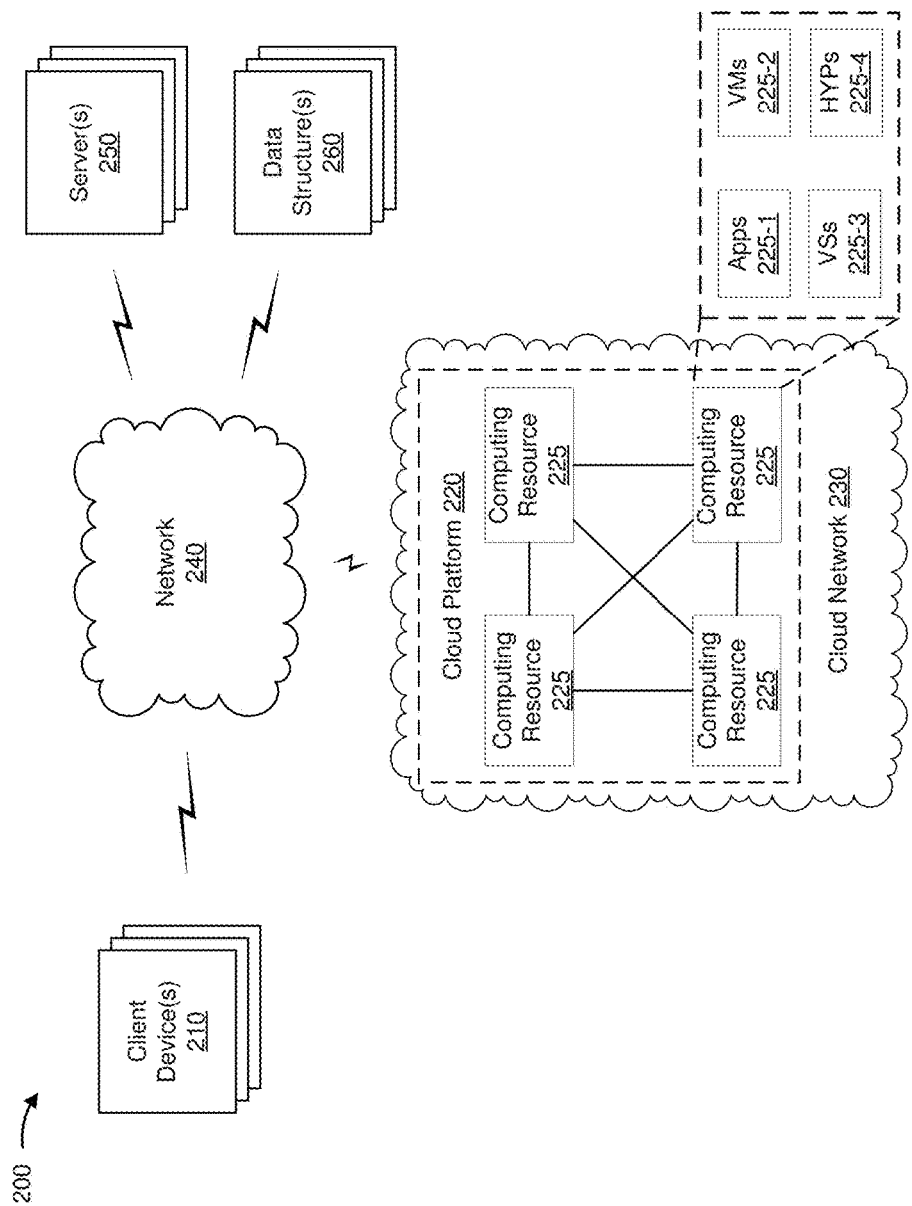
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client device(s) 210, a cloud platform 220, a cloud network 230, a network 240, one or more server(s) 250, and one or more data structure(s) 260. Devices of environment 200 may interconnect via wired connections, wireless connections, or a combination of wired and wireless connections.

Client device 210 includes one or more devices capable of receiving, generating, storing, processing, and/or providing a set of user interfaces relating to performance achievement. For example, client device 210 may include a communication and/or computing device, such as a mobile phone (e.g., a smart phone or a radiotelephone), a computer (e.g., a laptop computer, a tablet computer, a handheld computer, or a desktop computer), a wearable communication device (e.g., a smart wristwatch or a pair of smart eyeglasses), or a similar type of device. In some implementations, client device 210 may receive information from and/or transmit information to another device in environment 200 (e.g., via network 240).

Cloud platform 220 includes one or more devices capable of storing, processing, and/or routing a set of user interfaces relating to performance achievement. For example, cloud platform 220 may include a server that is associated with assigning resources of cloud network 230, directing functionalities of cloud network 230, or the like. In some implementations, cloud platform 220 may include a communication interface that allows cloud platform 220 to receive information from and/or transmit information to other devices in environment 200. While cloud platform 220 is described as a resource in a cloud computing network, such as cloud network 230, cloud platform 220 may operate external to a cloud computing network, in some implementations.

In some implementations, cloud platform 220 may be hosted by a cloud computing environment, such as cloud network 230 or the like. The cloud computing environment may provide computation, software, data access, storage, etc. services that do not require end-user knowledge of a physical location and configuration of system(s) and/or device(s) that host cloud platform 220. As shown, the cloud computing environment may include a group of computing resources 225 (referred to collectively as "computing resources 225" and individually as "computing resource 225").

Computing resource 225 includes one or more personal computers, workstation computers, server devices, or another type of computation and/or communication device. In some implementations, computing resource 225 may host cloud platform 220. The cloud resources may include compute instances executing in computing resource 225, storage devices provided in computing resource 225, data transfer devices provided by computing resource 225, or the like. In some implementations, computing resource 225 may communicate with other computing resources 225 via wired connections, wireless connections, or a combination of wired and wireless connections.

As further shown in FIG. 2, computing resource 225 includes a group of cloud resources, such as one or more applications ("APPs") 225-1, one or more virtual machines ("VMs") 225-2, one or more virtualized storages ("VSs") 225-3, or one or more hypervisors ("HYPs") 225-4.

Application 225-1 includes one or more software applications that may be provided to or accessed by one or more devices of environment 200. For example, applications 225-1 may include a set of applications associated with a set of user interfaces, such as a team dashboard user interface, a performance management user interface, a social dashboard user interface, or the like. Application 225-1 may eliminate a need to install and execute the software applications on devices of environment 200. For example, application 225-1 may include software associated with cloud platform 220 and/or any other software capable of being provided via a cloud computing environment. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., associated with one or more devices of environment 200), and may manage infrastructure of a cloud computing environment, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 may provide hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Cloud network 230 includes an environment that delivers computing as a service, whereby shared resources, services, etc. may be provided by cloud platform 220 to store, process, and/or route information associated with a set of user interfaces relating to performance achievement. Cloud network 230 may provide computation, software, data access, storage, and/or other services that do not require end-user knowledge of a physical location and configuration of a system and/or a device that delivers the services (e.g., cloud platform 220). As shown, cloud network 230 may include cloud platform 220 and/or may communicate with client device 210 via one or more wired or wireless networks (e.g., network 240).

Network 240 includes one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a personal area network (PAN), a telephone network (e.g., the Public Switched Telephone Network (PSTN)), a private network, an ad hoc network, an intranet, the Internet, a fiber optic-based network, a cloud computing network, a peer-to-peer network, or the like, and/or a combination of these or other types of networks.

Server 250 includes one or more devices capable of receiving, storing, determining, processing, and/or providing information associated with employee information, team information, or the like. For example, servers 250 may include a first server that provides first information regarding an employee or a team (e.g., a first entity or a first group of entities) of an organization, a second server that provides second information regarding another employee or another team (e.g., of another, similar organization), or the like. In some implementations, server 260 may communicate with cloud platform 220 to provide information to cloud platform 220, to permit cloud platform 220 to generate one or more user interfaces for an employee or a team of employees.

Data structure 260 includes one or more data structures capable of receiving, storing, and/or providing information associated with employee information, team information, or the like. For example, data structure 260 may include a set of data structures of a server 250. In some implementations, data structure 260 may include a data structure associated with an application programming interface (API). For example, data structure 260 may include a data structure of a social media website, from which data may be obtained using the API.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
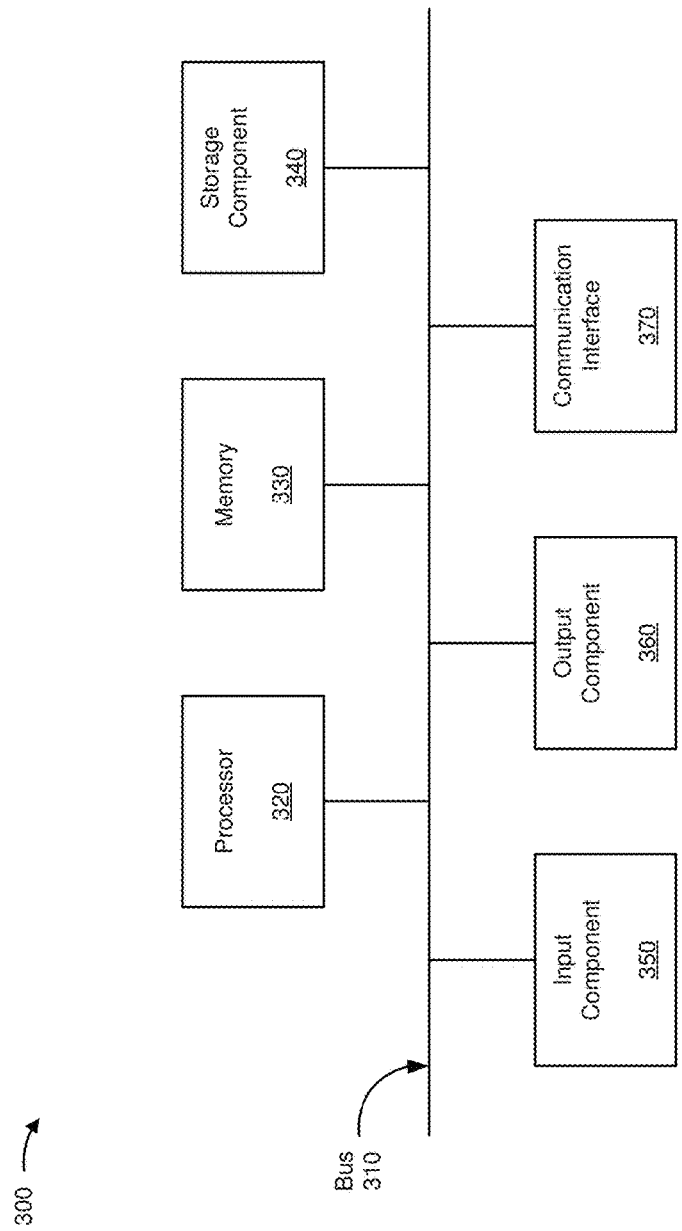
FIG. 3 is a diagram of example components of one or more devices of FIG. 2.

FIG. 3 is a diagram of example components of a device 300. Device 300 may correspond to client device 210, cloud platform 220, and/or server 250. In some implementations, client device 210, cloud platform 220, and/or server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 providing a user interface to enable performance achievement for an employee of an organization. In some implementations, one or more process blocks of FIG. 4 may be performed by cloud platform 220. In some implementations, one or more process blocks of FIG. 4 may be performed by another device or a group of devices separate from or including cloud platform 220, such as client device 210 and/or server 250.

As shown in FIG. 4, process 400 may include receiving employee information associated with an employee (block 410). For example, cloud platform 220 may receive employee information associated with the employee. In some implementations, cloud platform 220 may receive employee information associated with a set of employees (e.g., a set of entities) of an organization. For example, cloud platform 220 may obtain employee information regarding the set of employees from a data structure storing employee information, such as a human resources data structure, a task assignment data structure (e.g., a role data structure), a compensation data structure, or the like. Additionally, or alternatively, cloud platform 220 may receive employee information regarding a set of employees of another organization (e.g., from a database of information regarding other organizations for which evaluations of employee performance have been performed or for which other data is available). For example, cloud platform 220 may identify one or more other organizations with a threshold similarity to the organization (e.g., based on a type of the organization, a size of the organization, an industry of the organization, a profitability of the organization, or an organizational structure of the organization), and may obtain information regarding employees of the one or more other organizations from one or more data structures. In this case, cloud platform 220 may filter employee information regarding a set of organizations to obtain a subset of employee information relating to a subset of the set of organizations (e.g., the one or more organizations with a threshold similarity to the organization determined based on a similarity score), and may process the subset of the employee information to generate an analytical data model relating to individual achievement, team achievement, or the like.

In some implementations, cloud platform 220 may provide a user interface including a set of prompts to obtain employee information. For example, cloud platform 220 may provide a set of questionnaires to a set of employees to obtain information regarding the set of employees. In some implementations, cloud platform 220 may provide a user interface including a set of prompts to a first user (e.g., a first employee) to obtain information regarding a second user (e.g., a second employee). For example, cloud platform 220 may identify the first employee, such as a supervisor of the second employee, a mentor of the second employee, a peer of the second employee, or the like based on information included in a data structure storing information regarding an organization. In this case, cloud platform 220 may communicate with client device 210 to provide a questionnaire for display to the first employee, may cause the user interface to include a set of prompts regarding the second employee, and may detect a set of user interactions with the user interface associated with indicating a response to the set of prompts.

In some implementations, cloud platform 220 may parse a document to obtain the employee information. For example, cloud platform 220 may utilize a natural language processing technique to parse a resume document and obtain information identifying a set of tasks completed by a particular employee (e.g., a particular entity), a set of roles assigned to the particular employee, a salary history of the particular employee, or the like. Additionally, or alternatively, cloud platform 220 may parse a performance review, an employee file (e.g., an image of an employee file using an optical character recognition (OCR) technique or a digitized employee file), or the like to obtain information identifying the set of tasks or the like. In some implementations, cloud platform 220 may communicate with a set of remote servers to obtain employee information. For example, cloud platform 220 may communicate with a remote server of a social media website using an application programming interface (API) to obtain information regarding the employee, such as a resume, a set of social media acquaintances (e.g., a set of social media friends, connections, or followers), or the like. In this way, by automatically obtaining employee information, cloud platform 220 may reduce a utilization of computing resources relative to another technique where employee information is manually entered via a user interface.

In some implementations, cloud platform 220 may obtain a particular type of employee information. For example, cloud platform 220 may obtain skills information regarding a set of skills of the employee, of another employee, or the like. In this case, cloud platform 220 may automatically determine a set of skills of the employee based on identifying a set of roles of the employee (e.g., a set of tasks completed by the employee for the organization, a set of roles previously held by the employee, or the like), and may analyze the set of roles using a skills data model to identify skills corresponding to the set of roles being completed. Additionally, or alternatively, cloud platform 220 may obtain priorities information regarding the employee, another employee, or the like. For example, cloud platform 220 may provide a user interface, via client device 210, with which to receive information identifying short-term priorities (e.g., priorities relating to a particular work assignment), long-term priorities (e.g., priorities relating to an employee's career), or the like. Additionally, or alternatively, cloud platform 220 may determine strengths of an employee corresponding to an employee's personality, innate talents, or the like (e.g., based on processing a data structure identifying responses to a set of questionnaire questions, based on providing questionnaire questions, etc.).

In some implementations, cloud platform 220 may dynamically alter a set of prompts based on one or more responses to the set of prompts. For example, based on receiving a particular response indicating a particular strength of an employee, cloud platform 220 may select a group of follow-up prompts based on a data structure linkage indicating a set of dependencies associated with the set of prompts (e.g., a linked list or a tree) to determine a level of the particular strength of the employee. In this case, cloud platform 220 may generate the group of follow-up prompts based on processing information identifying the set of dependencies between prompts of the set of prompts. In this way, cloud platform 220 reduces a utilization of computing resources relative to another technique by not providing prompts that will not result in receiving desired information.

In some implementations, cloud platform 220 may obtain employee information relating to performance achievement. For example, cloud platform 220 may obtain employee information indicating whether an employee satisfied a task or achievement associated with a priority relating to a particular period of time. Additionally, or alternatively, cloud platform 220 may obtain employee information indicating a level of performance of an employee, such as information identifying a set of sales figures, a set of performance evaluations, a set of client feedback reports, a set of production metrics, or the like.

In some implementations, cloud platform 220 may utilize a machine learning technique to obtain the employee information indicating the level of performance of the employee. For example, cloud platform 220 may obtain audio data from a recording of a peer coaching session (e.g., after transmitting a notification that the peer coaching session is to be recorded to each participant in the peer coaching session), and may apply a speech recognition technique to generate a transcript document of the peer coaching session. In this case, cloud platform 220 may apply a type of machine learning technique, such as a natural language processing technique, a term extraction technique, or the like to the transcript document to generate a set of priorities discussed during the peer coaching session, an evaluation of employee performance discussed during the peer coaching session or the like.

As further shown in FIG. 4, process 400 may include analyzing the employee information using an analytical data model to determine output information regarding the employee and relating to improving employee performance (block 420). For example, cloud platform 220 may analyze the employee information using the analytical data model (e.g., an analytical data model of employee achievement) to determine the output information regarding the employee and relating to improving employee performance. In some implementations, cloud platform 220 may generate the analytical data model based on the employee information. For example, cloud platform 220 may identify a set of employees associated with a threshold level of employee achievement (e.g., a threshold level of sales, a threshold level of client feedback, or a particular engagement level, such as a numerical engagement level, a threshold engagement level, such as a high threshold, a middle threshold, a low threshold, or the like, etc.) or an improving level of performance achievement, may generate an analytical data model for identifying attributes associated with the threshold level of employee achievement (e.g., performance achievement). In this way, cloud platform 220 may identify high engagement levels for employees from which high team performance may be determined, and/or identify low engagement levels for which recommendations are more likely to result in improving team performance (e.g., when the low engagement levels are improved by the recommendations).

In some implementations, cloud platform 220 may generate the analytical data model based on employee information relating to employees of another organization. For example, based on receiving employee information relating to one or more other organizations associated with a threshold similarity to the organization (e.g., based on calculating a similarity score), cloud platform 220 may analyze the employee information to generate attributes corresponding to a threshold level of performance achievement at the one or more other organizations. In this case, cloud platform 220 may generate the analytical data model to generate one or more attributes that may be obtained by a particular person based on a set of current attributes relating to the particular person based on employee information identifying a change in attributes over time (e.g., information indicating attributes acquired by other employees based on training programs or tasks assigned to the other employees).

As a particular example, cloud platform 220 may determine a model of a correlation or a pattern of employee attributes to performance for a first company, may identify a second company, and may use the model of correlations or patterns to identify recommendations for employees of the second company to improve employee performance at the second company. In this way, cloud platform 220 may process millions or billions of data points relating to hundreds or thousands of factors in employee performance to identify performance improvements for employees of a company.

In some implementations, cloud platform 220 may generate the analytical data model using a machine learning technique, such as a natural language processing technique (e.g., to obtain data for the analytical data model), a pattern recognition technique, a regression technique, or the like. For example, based on information regarding performance of employees at an organization and/or one or more similar organizations, cloud platform 220 may utilize a machine learning technique to generate associations between attributes of employees (e.g., a strength, a priority, or a level of engagement) that correspond to threshold levels or improving levels of performance by the employee. In some implementations, cloud platform 220 may validate the analytical data model. For example, cloud platform 220 may determine a predicted effect of viewing a training course based on an analytical data model generated using a portion of information, and may identify, in another portion of information, an employee who viewed the training course. In this case, cloud platform 220 may validate that the predicted effect corresponds to an observed effect on the employee.

Additionally, or alternatively, cloud platform 220 may generate the analytical data model based on employee information relating to one or more employees similar to the employee. For example, cloud platform 220 may identify one or more other employees with a threshold similarity to the employee (e.g., one or more employees sharing a common role, a common level of experience, a common set of skills or strengths, or a common compensation level). In this case, cloud platform 220 may determine one or more attributes of the one or more other employees that correspond to the one or more other employees satisfying the threshold level of performance achievement based on the analytical data model.

In some implementations, cloud platform 220 may obtain the analytical data model from a data structure. For example, based on generating the analytical data model, cloud platform 220 may store the analytical data model via a data structure. In this case, cloud platform 220 may obtain the analytical data model when cloud platform 220 is to analyze the employee information. Additionally, or alternatively, cloud platform 220 may communicate with another device, such as another cloud platform 220, client device 210, or the like to obtain the analytical data model. For example, a first cloud platform 220 may generate analytical data model for assessing employees of a first organization and may communicate with a second cloud platform 220 to provide the analytical data model for assessing employees of a second organization.

In some implementations, cloud platform 220 may analyze the employee information to determine a set of alerts. For example, cloud platform 220 may determine, based on employee information identifying a date of a feedback session regarding performance of the employee, that a threshold amount of time has elapsed from the date of the feedback session, and may determine that the employee is to be scheduled for another feedback session. In this case, cloud platform 220 may select the threshold amount of time between feedback sessions based on the employee's performance, based on one or more attributes of the employee, or the like. For example, for an employee who has satisfied a threshold level of performance achievement for a threshold period of time and who is determined to be on a trend to satisfy the threshold level of performance achievement, cloud platform 220 may select a relatively long period of time between feedback sessions. Similarly, for an employee who is not determined to satisfy the threshold level of performance achievement, cloud platform 220 may select a relatively short period of time between feedback sessions, thereby customizing alerts generated to identify a new feedback session time being scheduled and reducing a likelihood that the employee fails to satisfy the threshold level of performance achievement as a result of insufficient feedback. In another example, for an employee associated with a strength relating to self-motivation, cloud platform 220 may select a relatively long period of time between feedback sessions relative to another employee associated with a weakness relating to self-motivation.

In some implementations, cloud platform 220 may analyze the employee information to generate a set of recommendations. For example, cloud platform 220 may analyze the employee information using the analytical data model to generate a set of attributes corresponding to satisfying a threshold level of performance achievement, such as a set of priorities, a set of skills, or the like, and may select a particular attribute to identify to the employee and/or assist the employee in achieving based on employee information regarding the employee. In this case, cloud platform 220 may select output information associated with causing the employee to adopt the particular attribute. For example, cloud platform 220 may determine, based on the analytical data model, that a first group of employees with a first group of skills satisfy a threshold likelihood of achieving a second group of skills, which correspond to satisfying a threshold level of performance achievement (e.g., employees with the second group of skills are associated with a threshold likelihood of satisfying the threshold level of performance achievement), based on attending a training program. In this case, cloud platform 220 may provide a recommendation that a particular employee associated with the first group of skills attend the training program to gain the second group of skills.

Although described herein in terms of using a data model (e.g., an analytical data model), cloud platform 220 may utilize another technique to analyze information, such as an artificial intelligence technique, a supervised learning technique, a regression technique, a machine learning technique, or the like.

In some implementations, cloud platform 220 may determine a set of scores for a set of recommendations, and may select a particular recommendation based on the set of scores. For example, cloud platform 220 may determine, based on the analytical data model, a likelihood of a particular recommendation improving employee performance for a particular employee, and may determine a score for the particular recommendation based on the likelihood. Similarly, cloud platform 220 may determine, based on the analytical data model, a likelihood of the particular recommendation being implemented (e.g., a likelihood of adoption) by the particular employee based on employee engagement, and may determine a score for the particular recommendation based on the likelihood. In some implementations, cloud platform 220 may determine a score for the particular recommendation based on multiple factors, such as a likelihood of improving employee performance, a likelihood of implementation by the particular employee, a schedule availability of the particular employee, a cost to implement the particular recommendation, or the like. In this way, cloud platform 220 may reduce computing resources by providing a recommendation that is likely to be used, successful, or the like relative to another technique that may provide multiple recommendations based on recommendations being rejected, unsuccessful, or the like.

In some implementations, cloud platform 220 may select a particular type of recommendation based on analyzing the employee information. For example, cloud platform 220 may select a recommendation relating to altering an action plan for an employee, altering a role for an employee, realigning a set of priorities of an employee, or the like. In some implementations, cloud platform 220 may select a recommendation relating to identifying attributes of other employees associated with satisfying a threshold level of performance achievement. For example, cloud platform 220 may determine one or more priorities that are associated with other employees and which can be adopted by the employee, and may provide information identifying the one or more priorities to realign a set of priorities of the employee to include the one or more priorities. Additionally, or alternatively, cloud platform 220 may select a recommendation relating to providing a training program.

In some implementations, cloud platform 220 may select a recommendation relating to employee interaction. For example, cloud platform 220 may select a recommendation that includes scheduling a feedback session, scheduling a coaching session, or the like. Additionally, or alternatively, cloud platform 220 may select another employee for the employee interaction based on skills of the employee and/or the other employee. For example, cloud platform 220 may determine that a first employee is associated with a first set of skills, and may select a second employee associated with a second set of skills as a coach, a mentor, or the like for the first employee. In this case, cloud platform 220 may determine that the second employee with the second set of skills is associated with a threshold likelihood of improving performance for the first employee with the first set of skills based on the analytical data model.

As further shown in FIG. 4, process 400 may include providing an individual achievement user interface for the employee including output information regarding the employee (block 430). For example, cloud platform 220 may provide the individual achievement user interface for the employee including the output information regarding the employee. In some implementations, cloud platform 220 may provide, via the individual achievement user interface, information regarding the employee via the individual achievement user interface. For example, cloud platform 220 may provide information regarding strengths of the employee, priorities of the employee, or the like based on determining the employee information. In this way, cloud platform 220 ensures transparency in employee evaluation and future growth opportunities for an organization and the employee.

In some implementations, cloud platform 220 may generate a user interface to provide the individual achievement user interface including the output information regarding the employee. For example, cloud platform 220 may select the user interface from a set of user interface templates to correspond to the recommendation. In some implementations, cloud platform 220 may select a particular set of modules for the user interface, such as a gamification module, a social sharing module, a strengths or skills information module, a recommendation module, an alerts module, or the like. In some implementations, cloud platform 220 may automatically scale one or more modules of the user interface, such as based on a quantity of information that is to be provided via a module, a quantity of recommendations, a quantity of strengths, or the like.

In some implementations, cloud platform 220 may provide, via the individual achievement user interface, information relating to attributes associated with a threshold level of performance achievement. For example, cloud platform 220 may provide information identifying a set of priorities corresponding to the threshold level of performance achievement (e.g., an employee with a particular priority is determined to have a threshold likelihood of achieving the threshold level performance achievement). Similarly, cloud platform 220 may provide information identifying a set of skills or strengths corresponding to the threshold level of performance achievement. In this way, cloud platform 220 provides information that may be utilized by an employee to improve employee performance by adopting priorities, adopting skills, developing strengths, or the like of other employees that achieve a threshold level of performance achievement.

In some implementations, cloud platform 220 may provide a subset of available information via the individual achievement user interface. For example, cloud platform 220 may select a quantity of recommendations to provide, and may provide the quantity of recommendations to avoid requiring the employee to navigate multiple screens of the individual achievement user interface. In this way, cloud platform 220 may reduce a utilization of computing resources relative to transmitting all available information, requiring the employee to navigate multiple screens to view all available information, or the like.

In some implementations, cloud platform 220 may provide, via the user interface, information generating a recommendation. For example, cloud platform 220 may generate a recommendation identifying a training program for the employee, a coaching session for the employee, or the like, and may provide identifying information via the user interface. In this case, cloud platform 220 may determine another employee sharing a common priority with the employee (e.g., completing a particular task), and may provide information identifying the other employee to facilitate a conversation to discuss the common priority. In some implementations, cloud platform 220 may implement the recommendation, and may provide output information associated with implementing the recommendation. For example, cloud platform 220 may detect a user interaction with the user interface (e.g., an interaction by the employee, by a supervisor, or by a mentor) associated with accepting the recommendation, and may cause the recommendation to be implemented. In some implementations, cloud platform 220 may automatically implement the recommendation. For example, cloud platform 220 may automatically generate a calendar event for the employee and a supervisor, and may communicate with a set of client devices 210 to cause the calendar event to be provided for display to the employee and the supervisor.

Additionally, or alternatively, cloud platform 220 may automatically cause a training program to be provided to the employee. For example, cloud platform 220 may search a data structure of training programs, the Internet, or the like to identify a training program relating to a particular skill, and may cause the training program to be provided for playback to the employee to cause the employee to obtain the particular strength. Additionally, or alternatively, cloud platform 220 may identify an in-person training program, and may automatically communicate with another device (e.g., a registration server) to register the employee for the training program, to reserve transportation and accommodation, to provide payment, or the like.

In some implementations, cloud platform 220 may automatically cause a recommendation relating to employee retention or compensation to be implemented. For example, based on determining that a first employee is associated with a threshold likelihood of satisfying a first level of performance achievement, cloud platform 220 may cause a first level of compensation to be selected for the first employee, and may automatically alter a compensation data structure to implement the first level of compensation. In this case, cloud platform 220 may alter the compensation data structure to implement a second level of compensation for a second employee associated with a second level of performance achievement.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
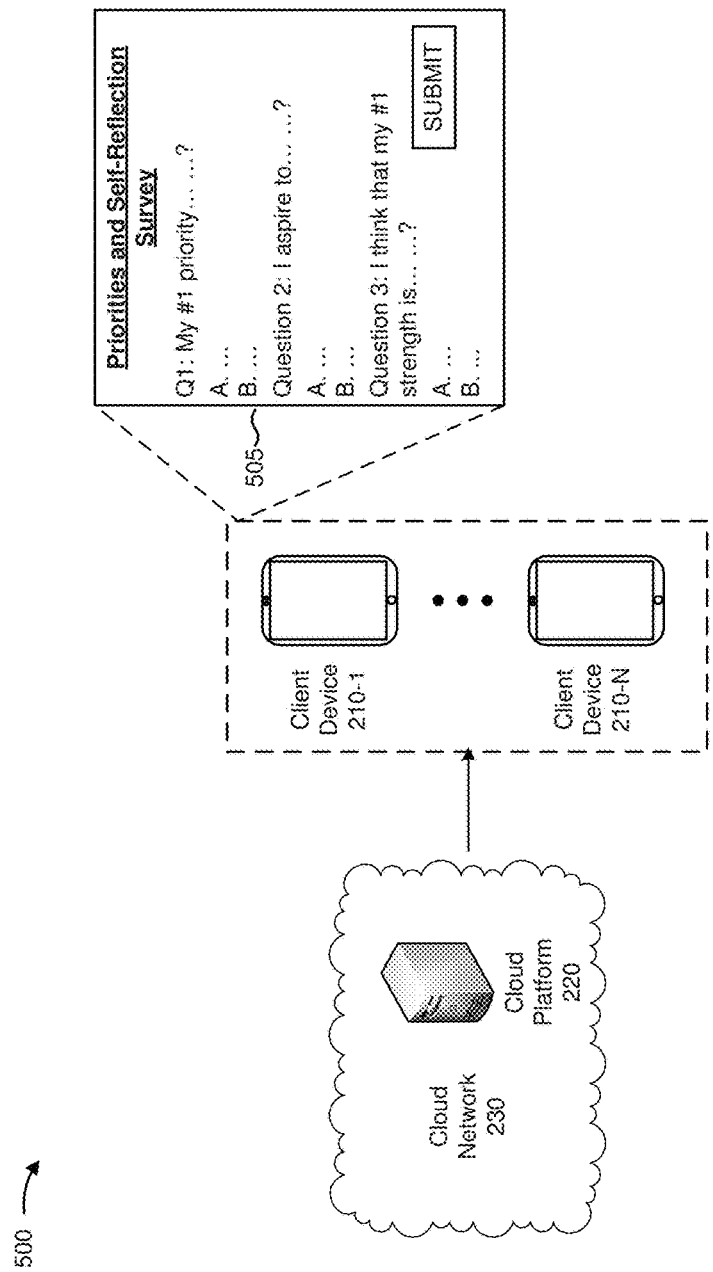
FIGS. 5A-5C are diagrams of an example implementation relating to the example process shown in FIG. 4.
Figure 5B:
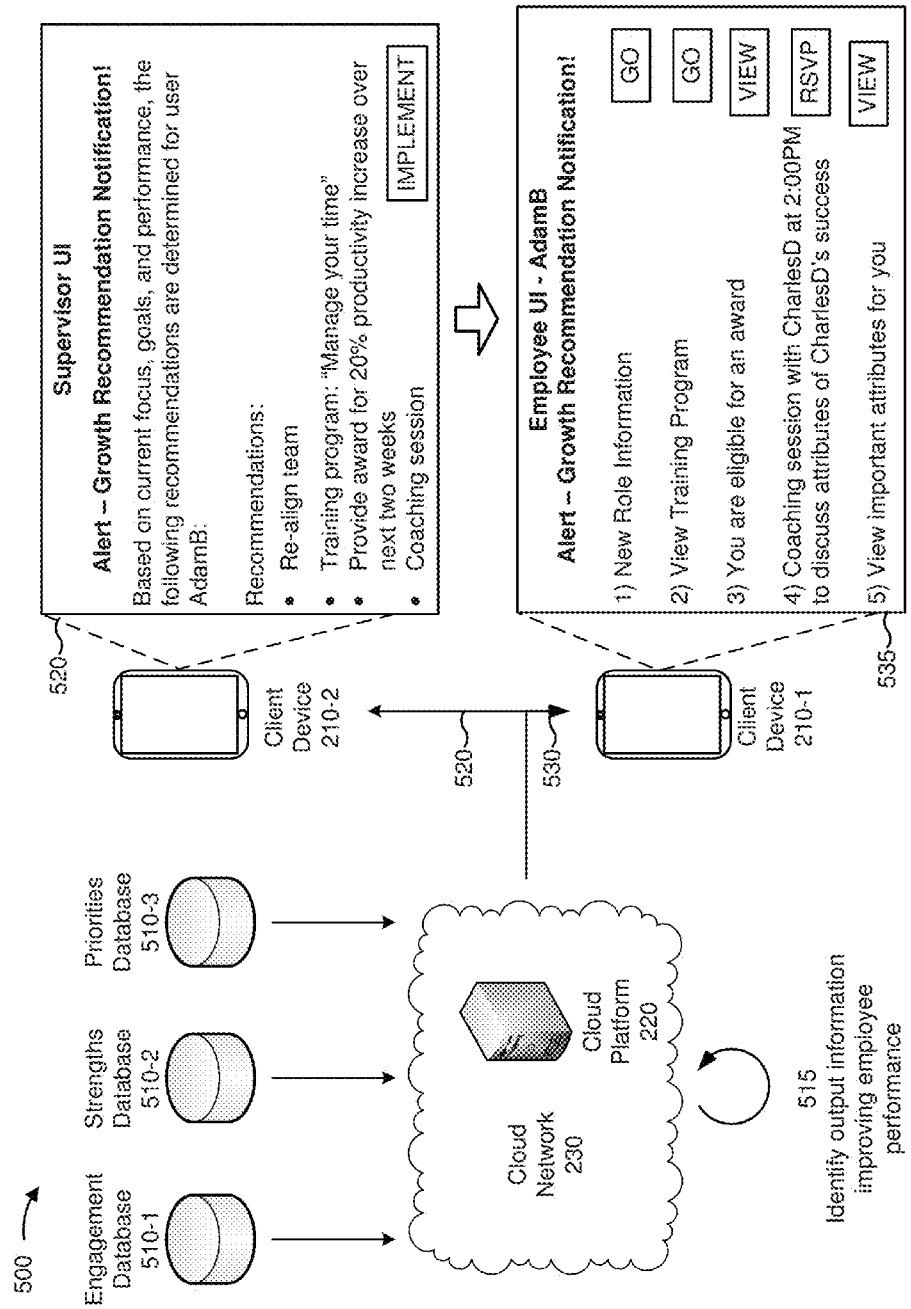
Figure 5C:
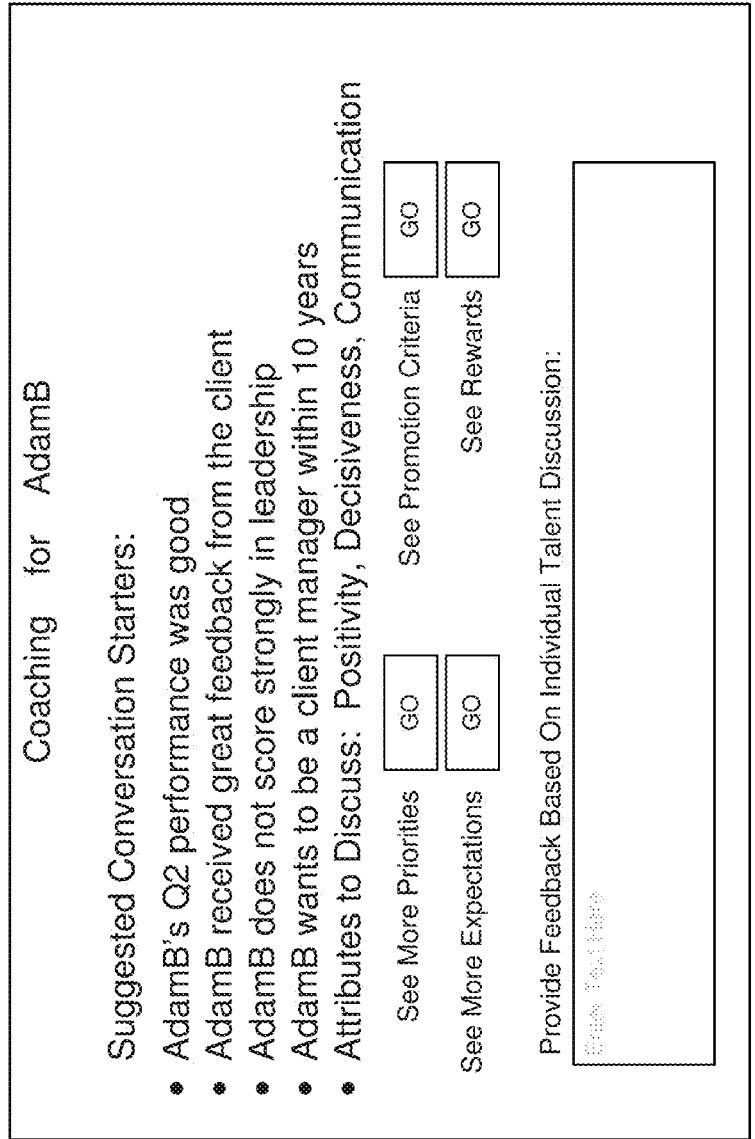

FIGS. 5A-5C are diagrams of an example implementation 500 relating to example process 400 shown in FIG. 4. FIGS. 5A-5C show an example of providing a user interface (e.g., an individual achievement user interface) to enable performance achievement for an employee of an organization.

As shown in FIG. 5A, cloud platform 220 provides, via a set of client devices 210, a priorities and self-reflection survey relating to determining priorities of a set of employees. For example, cloud platform 220 may select, for display via client device 210-1 to a particular employee, a particular set of prompts regarding priorities of the employee, and may cause the particular set of prompts to be provided for display via user interface 505 of client device 210-1. Based on detecting a set of user interactions with user interface 505 of client device 210-1, cloud platform 220 may receive a set of responses to the particular set of prompts, and may process the set of responses to determine a set of priorities of the particular employee. Assume that cloud platform 220 stores the set of responses for subsequent utilization via a data structure (e.g., a priorities database).

As shown in FIG. 5B, cloud platform 220 receives employee information from a set of databases 510, such as receiving engagement information from engagement database 510-1, strengths information from strengths database 510-2, and priorities information from priorities database 510-3. As shown by reference number 515, cloud platform 220 processes the employee information using an analytical data model to generate output information to improve employee performance. As shown by reference number 520, based on generating the output information, cloud platform 220 causes client device 210-2 (e.g., being utilized by a supervisor of the employee), to provide an individual achievement user interface 525. Cloud platform 220 provides, via individual achievement user interface 525, an alert (e.g., a growth recommendation notification) indicating that a particular set of recommendations are generated for the employee and a team that includes the employee. Based on determining an alteration to a team, cloud platform 220 provides, via individual achievement user interface 525, a set of recommendations to re-align the team that includes the employee (e.g., to reassign work to ensure that the work is completed), that the employee is to be provided a training program, that the employee is to be offered an award for achieving a threshold productivity increase, and that the employee is to be provided a peer coaching session with another employee (e.g., selected based on one or more strengths of the employee and/or the other employee). Assume that cloud platform 220 detects an interaction with user interface 520 associated with implementing the set of recommendations.

As further shown in FIG. 5B, and by reference number 530, based on detecting the interaction with user interface 520, cloud platform provides a user interface 535 for display to the employee via client device 210-1. User interface 535 includes information identifying a new role for the employee (e.g., based on cloud platform 220 automatically realigning the team), the training program, the award, and the coaching session. User interface 535 includes information identifying a set of attributes of other employees determined to be important for the employee, such as a set of priorities that can be adopted by the employee, a set of skills that can be obtained by the employee (e.g., by viewing the training program), or the like.

As shown in FIG. 5C, cloud platform 220 provides, in advance of the peer coaching session (e.g., or, in another example, another type of coaching session), a user interface 540 including enablement content for the peer coaching session (e.g., to improve an effectiveness of the peer coaching session). For example, cloud platform 220 provides information identifying a set of conversation starters for display to the other employee to identify performance of the employee, such as performance of the employee, priorities of the employee, attributes to be adopted by the employee, or the like. Cloud platform 220 provides information identifying promotion criteria for the employee selected based on an employee priority, organizational expectations for the employee determined based on roles associated with the employee or the like. Cloud platform 220 provides, via user interface 540, a user interface element for receiving feedback based on the peer coaching session, which may be parsed by cloud platform 220 using a natural language processing technique to identify results of the peer coaching session and update employee information regarding the employee.

As indicated above, FIGS. 5A-5C are provided merely as an example. Other examples are possible and may differ from what was described with regard to FIGS. 5A-5C.

In this way, cloud platform 220 provides a personalized individual achievement user interface including information to improve employee performance of an employee. Moreover, cloud platform 220 provides information identifying priorities, skills, strengths, and/or engagement of the employee to improve employee understanding of personal performance relative to another technique for employee evaluations. Furthermore, based on processing priorities information, skills information, engagement information, or the like, cloud platform 220 provides information identifying attributes of high achieving employees (e.g., employees satisfying a threshold level of performance achievement), thereby permitting an employee to implement the attributes for the employee (e.g., the employee may adopt one or more of the attributes to attempt to improve performance).

In this way, cloud platform 220 improves employee performance relative to another technique for employee management, thereby improving a likelihood of employee retention and reducing a utilization of computing resources relating to finding and/or training a new employee. Moreover, based on improving employee performance, cloud platform 220 reduces a utilization of computing resources (e.g., processing resources and/or memory resources) associated with completing projects (e.g., software development projects, analysis projects, or design projects), relative to being required to expend computing resources to complete and fix projects performed by lower performing employees for whom a personalized individual achievement user interface is not provided.

Figure 6:
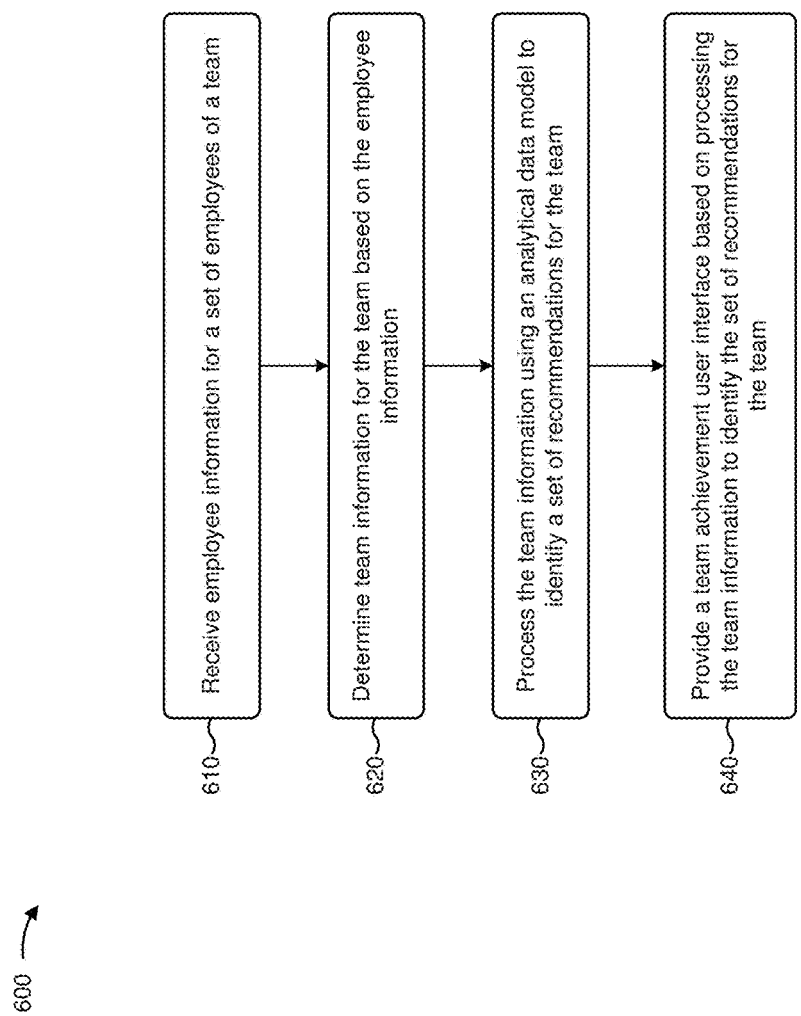
FIG. 6 is a flow chart of an example process for providing a user interface to enable performance achievement for a team of employees of an organization.

FIG. 6 is a flow chart of an example process 600 for providing a user interface to enable performance achievement for a team of employees of an organization. In some implementations, one or more process blocks of FIG. 6 may be performed by cloud platform 220. In some implementations, one or more process blocks of FIG. 6 may be performed by another device or a group of devices separate from or including cloud platform 220, such as client device 210 and/or server 260.

As shown in FIG. 6, process 600 may include receiving employee information for a set of employees of a team (block 610). For example, cloud platform 220 may receive employee information (e.g., individual strengths information, individual priorities information, and/or individual engagement information) for the set of employees of the team (e.g., a group of entities, such as a group of employees). In some implementations, cloud platform 220 may obtain the employee information from a data structure. For example, when cloud platform 220 is to provide a user interface including information regarding an employee, cloud platform 220 may obtain employee information from an organization data structure, such as a human resources data structure, a human capital management data structure, a compensation data structure, a data structure storing results of a set of questionnaires, or the like.

In some implementations, cloud platform 220 determine employee information based on providing a questionnaire. For example, cloud platform 220 may generate a questionnaire regarding employee strengths, employee priorities, or employee engagement, and may provide the questionnaire for display via a user interface. In this case, cloud platform 220 may detect an interaction with the user interface associated with indicating a response to the questionnaire, and may determine the employee information based on the response to the questionnaire. In some implementations, cloud platform 220 may cause information identifying a status of the questionnaire (e.g., a response rate, a quantity of missing responses, or a quantity of employees who have responded) to be included in a team achievement user interface to permit a team manager to ensure that team members provide up-to-date and accurate information for managing a team.

In some implementations, cloud platform 220 may parse a result of the questionnaire using a machine learning technique to determine the employee information. For example, cloud platform 220 may utilize a natural language processing technique to generate a particular employee priority from a text-based answer to a questionnaire prompt regarding employee priorities. Similarly, cloud platform 220 may utilize a sentiment analysis technique to determine a level of employee engagement (or engagement of a team to which the employee is assigned) based on a set of responses to a set of questions. For example, cloud platform 220 may provide a question, for display via a user interface, relating to employee satisfaction and may utilize the sentiment analysis to determine whether an employee is happy with the employee's job, upset with the employee's job, or the like.

In some implementations, cloud platform 220 may determine employee information based on obtaining information regarding a set of roles of a set of employees. For example, cloud platform 220 may obtain information identifying a set of roles of a set of employees (e.g., a set of work assignments for a set of projects, such as a particular employee being assigned to a developer role, a tester role, or a manager role), and may determine a set of skills for the set of employees based on the set of roles. In this case, cloud platform 220 may determine a level of skill of a particular employee based on determining that the employee worked in a particular role associated with requiring the skill or developing the skill for a threshold period of time, and may calculate a proficiency level of an employee based on the level of skill.

In some implementations, an employee may be categorized (e.g., by cloud platform 220) into a group based on the employee information. The group may refer to a set of strengths for which an employee satisfies a threshold level of proficiency. For example, cloud platform 220 may categorize an employee as having a strength for achievement, belief, consistency, and/or focus, as having a strength for communication, competition, and/or self-assurance, a strength for adaptability, connectedness, harmony, and/or empathy, a strength for analytics, future-thinking, learning, and/or strategy, or the like. In another example, cloud platform 220 may receive a categorization of an employee into a group from another server that performs categorizations of strengths. In another example, cloud platform 220 may categorize employees into another type of group or based on another grouping of strengths.

In this way, cloud platform 220 may generate a profile for an employee that may be used to market the employee to a client, to determine a role for the employee, for the employee to use in negotiating for a promotion, or the like. In this way, cloud platform 220 may account for an interplay between multiple strengths of an employee, and may provide information that may improve an ability of an organization to obtain work and may improve employee satisfaction with organizational transparency, relative to information regarding groups of strengths remaining opaque to the organization or the employee.

As shown in FIG. 6, process 600 may include determining team information based on the employee information (block 620). For example, cloud platform 220 may determine the team information based on the employee information. In some implementations, cloud platform 220 may determine a particular type of team information based on the employee information. For example, cloud platform 220 may determine a set of team priorities based on one or more priorities of the set of employees of the team. Additionally, or alternatively, cloud platform 220 may determine a set of team strengths for a team of employees (e.g., a team of entities) based one or more strengths of the set of employees of the team, team engagement based on engagement information of the set of employees of the team, or the like. In some implementations, cloud platform 220 may determine the team information based on information obtained from a data structure. For example, cloud platform 220 may obtain information identifying a set of team priorities that are different from the one or more priorities of the set of employees of the team.

In some implementations, cloud platform 220 may process the employee information to determine the team information. For example, cloud platform 220 may process information identifying strengths of each employee of the team to determine team strengths for the team. In some implementations, cloud platform 220 may determine the team strengths based on an average strength of each employee of the team for a set of types of strengths. For example, when cloud platform 220 determines that a first employee of the team is associated with a relatively high level of communication strength (e.g., the first employee has a communication strength, and relative to other employees with the communication strength, the first employee is determined to be a better communicator) and a second employee of the team is associated with a relatively low level of communication strength (e.g., relative to another person), cloud platform 220 may determine that the team is, collectively, associated with a relatively medium level of communication strength based on communication strengths (or a lack thereof) among employees of the team. In this way, cloud platform 220 accounts for each employee having awareness of where the teams have greater and/or lesser strengths, so that the teams can determine how to utilize and/or compensate for the greater and/or lesser strengths.

In some implementations, cloud platform 220 may determine the team strengths based on a set of top strengths for each employee of the team. For example, when the first employee is associated with the relatively high level of communication strength and the second employee is associated with the relatively low level of communication strength, cloud platform 220 may determine that the team is associated with the relatively high level of communication strength. In this way, cloud platform 220 accounts for a member of the team with a highest level of strength for a particular set of strengths and can recommend that employee being assigned to complete a task requiring the particular set of strengths on behalf of the team.

In some implementations, cloud platform 220 may determine the team strengths based on another technique. For example, cloud platform 220 may determine the team strengths based on a combination of averaging strengths and determining top strengths. Additionally, or alternatively, cloud platform 220 may determine the team strengths based on a combination of multiple levels of strength for multiple employees of the team. For example, when a first employee and a second employee are each associated with a medium level of communication strength, cloud platform 220 may determine a high level of communication strength for the team. In this way, cloud platform 220 accounts for an effect of multiple employees working together on a task requiring a particular strength (e.g., multiple employees with a medium level of communication strength can perform at a similar level to a single employee with a high level of communication strength).

In some implementations, cloud platform 220 may categorize a team based on a group to which an employee of the team is categorized. For example, cloud platform 220 may categorize the team as a strategic thinking team based on one or more employees of the team being categorized as strategic thinkers. Similarly, cloud platform 220 may categorize the team as an influencing team based on one or more employees of the team being categorized as influencers. In this way, cloud platform 220 identifies a group dynamic associated with an interplay of multiple strengths of one or more employees. Moreover, cloud platform 220 determines information that may be utilized to assign teams to roles, obtain client work for teams, provide transparency toward team direction to team employees, or the like.

In some implementations, cloud platform 220 may apply a set of weights to a set of factors to categorize the team. For example, cloud platform 220 may weight employee strengths based on a confidence metric relating to an accuracy of a strengths determination, an amount of time an employee has been working at the organization, a matching metric associated with an extent to which an employee's skills align with a set of skills required for a task, or the like. In this case, cloud platform 220 may determine that a first skill level of a first employee in code testing is associated with a first confidence value (e.g., based on data from which the first skill was determined) and that a second skill level of a second employee in code testing is associated with a second, lower confidence value, and may weight the first skill level more highly than the second skill level in determining an overall skill level for the team that includes the first employee and the second employee.

In some implementations, cloud platform 220 may remove an employee from a calculation of a categorization of a team based on a weighting factor. For example, when an employee does not satisfy a threshold value for a factor (e.g., a threshold confidence metric or a threshold amount of time employed), cloud platform 220 may remove information regarding the employee from a calculation of a team categorization, thereby reducing a utilization of computing resources relative to another technique.

As further shown in FIG. 6, process 600 may include processing the team information using analytical data model to generate a set of recommendations for the team (block 630). For example, cloud platform 220 may process the team information using the analytical data model (e.g., an analytical data model of team achievement) to generate the set of recommendations for the team. In some implementations, cloud platform 220 may generate the analytical data model associated with team achievement. For example, cloud platform 220 may analyze employee information and/or team information relating to a set of employees of an organization, a set of teams of the organization, or the like, to generate one or more attributes of teams satisfying a threshold level of performance achievement. Additionally, or alternatively, cloud platform 220 may analyze employee information and/or team information relating to a set of employees or a set of teams of another organization. For example, cloud platform 220 may identify a similar organization to the organization (e.g., based on an industry, an organization size, an organization profitability, an organization location, or an organization structure), and may generate the analytical data model based on attributes that correspond to the threshold level of performance achievement (e.g., one or more priorities, one or more skills, and/or a level of engagement that corresponds to a threshold likelihood of a team satisfying a threshold level of performance achievement). In some implementations, cloud platform 220 may utilize a technique other than or in combination with an analytical data model, such as an artificial intelligence technique, a machine learning technique, or the like.

In some implementations, cloud platform 220 may generate the analytical data model of team achievement using a machine learning technique, such as a natural language processing technique (e.g., to obtain data for the analytical data model), a pattern recognition technique, a regression technique, or the like. For example, based on information regarding performance of teams of employees at an organization and/or one or more similar organizations, cloud platform 220 may utilize a machine learning technique to generate associations between attributes of teams of employees (e.g., a team strength, a team priority, or a level of team engagement) that correspond to threshold levels of performance by the team. Additionally, or alternatively, cloud platform 220 may determine an association between multiple skills of the team. For example, cloud platform 220 may determine that a combination of multiple skills, when possessed by a team of employees, result in improved levels of team performance relative to another combination of multiple skills. In some implementations, cloud platform 220 may validate the analytical data model. For example, cloud platform 220 may determine a predicted effect of viewing a training course based on an analytical data model generated using a portion of information, and may identify, in another portion of information, an employee who viewed the training course. In this case, cloud platform 220 may validate that the predicted effect corresponds to an observed effect on the employee. In some implementations, cloud platform 220 may generate and/or use the analytical data model of team achievement in a similar manner to the analytical data model of individual achievement, described herein with regard to FIG. 4.

In some implementations, cloud platform 220 may process the team information using the analytical data model to determine a recommendation regarding the team. For example, based on determining that teams including a first employee categorized as having a first group of strengths employee and a second employee categorized as having a second group of strengths tend to perform better relative to other teams, cloud platform 220 may generate a recommendation relating to reassigning employees to ensure that each team has employees with the first group of strengths and with the second group of strengths. In this way, cloud platform 220 generates a recommendation to improve team achievement based on information relating to dynamics of multiple employees of a team.

In some implementations, cloud platform 220 may process the team information to determine a recommendation relating to a team coaching session. For example, cloud platform 220 may determine that a first employee of the team and a second employee of the team are associated with conflicting priorities, and may schedule a coaching session with a team supervisor for the first employee and the second employee to cause the conflicting priorities to be realigned. In this case, cloud platform 220 may automatically generate a guidance document for the coaching session based on generating a recommendation to schedule the coaching session. For example, cloud platform 220 may automatically generate a document identifying team priorities, employee performance, team achievement, discussion topics, or the like to assist the supervisor in the coaching session. In this way, cloud platform 220 generates a recommendation to improve team achievement with an increased accuracy relative to generating recommendations for a team without accounting for interpersonal dynamics of the team.

Additionally, or alternatively, cloud platform 220 may determine a recommendation relating to a group discussion for the team (e.g., to discuss employee aspirations, employee passions, employee long term goals, or the like, which may result in improved employee engagement and job satisfaction based on improved transparency). For example, cloud platform 220 may determine that team achievement can be improved based on improved transparency of team priorities and team strengths, and may determine that a group discussion of team priorities and team strengths is to be scheduled to improve transparency. In this case, cloud platform 220 may provide information identifying a set of group discussion topics for display via a team achievement user interface provided to multiple client devices 210 utilized by multiple employees of the team to facilitate the group discussion.

In some implementations, cloud platform 220 may process the team information to determine a recommendation relating to balancing and/or compensating for gaps in team strengths. For example, for a team that has a lesser number of employees with a set of strengths, cloud platform 220 may recommend an action to analyze whether that could be a barrier to the team's performance and may recommend potential mitigation actions (e.g., existing employees using their unique combinations of strengths to address the gap, bringing in a new team member with a set of strengths that complements the team, or the like).

As another example, cloud platform 220 may utilize the analytical data model to determine an effect of a particular set of strengths of the set of employees on team achievement (e.g., a prediction regarding team achievement), and may provide a recommendation relating to improving one or more strengths to improve team achievement. In some implementations, cloud platform 220 may determine a recommendation relating to improving a strength for which the team lacks an employee with a threshold level of strength. For example, cloud platform 220 may determine that a team lacks an employee with a threshold level of strength in negotiation, and may recommend a training program for an employee of the team so that the employee may gain the threshold level of strength in negotiation. In this case, cloud platform 220 may select the employee based on determining that one or more other strengths of the employee cause the employee to be predicted to be mostly likely to improve negotiation skills based on viewing the training program. Based on increasing an accuracy of selection of employees for training sessions relative to another technique for selecting a training session for an employee, cloud platform 220 reduces a likelihood of requiring multiple employees to view the training session based on repeated failures, thereby reducing computing resources relative to multiple employees being provided the training session and failing to acquire a threshold level of strength in an associated skill In some implementations, cloud platform 220 may process the team information to generate a recommendation relating to providing recognition to an employee of the set of employees. For example, cloud platform 220 may determine, using the analytical data model, that improving a level of engagement of a particular employee of the team (or engagement of the team that includes the employee) is associated with a threshold increase to team achievement for the team and/or for one or more other employees of the team. In this case, cloud platform 220 may provide a recommendation relating to providing public recognition of the particular employee, such as organizing a party, providing additional compensation, providing an award, or the like to improve the level of engagement of the particular employee. In some implementations, cloud platform 220 may automatically schedule an event for the public recognition, order food for the event, reserve a location for the event, transmit a set of invitations for display via a set of client devices, or the like.

As further shown in FIG. 6, process 600 may include providing a team achievement user interface based on processing the team information to generate the set of recommendations for the team (block 640). For example, cloud platform 220 may generate the team achievement user interface based on processing the team information to generate the set of recommendations. In some implementations, cloud platform 220 may provide multiple views of the team achievement user interface for multiple users of the team achievement user interface. For example, cloud platform 220 may provide a supervisor view of the team achievement user interface including information relating to an engagement survey (e.g., information identifying a status of the engagement survey, results of the engagement survey, or trends of the engagement survey), a set of team strengths (e.g., information identifying a status of a strengths assessment survey, a set of individual strengths, or a set of team strengths), or the like. Additionally, or alternatively, cloud platform 220 may provide an employee view of the team achievement user interface including information relating to a coaching session (e.g., scheduling information or preparation information), information relating to a team action plan (e.g., a set of tasks to be completed by an employee, a set of training programs to be viewed by the employee, or a set of team-building activities for the employee), or the like.

In some implementations, cloud platform 220 may provide information identifying the set of recommendations via the team achievement user interface. For example, cloud platform 220 may provide information identifying a recommendation relating to training, team-building, peer coaching, or the like. In some implementations, cloud platform 220 may generate a score, and may provide information identifying a score for a recommendation. For example, cloud platform 220 may provide information associated with ranking a set of recommendations based on a priority of the set of recommendations, a feasibility of the set of recommendations, a cost of the set of recommendations, a time required to implement the set of recommendations, a predicted benefit of the set of recommendations, or the like. In this case, cloud platform 220 may select a particular recommendation, of the set of recommendations, based on a corresponding score, of a set of scores for the set of recommendations, and may provide information identifying the particular recommendation.

In some implementations, cloud platform 220 may provide a recommendation relating to team priorities via the team achievement user interface. For example, cloud platform 220 may provide information indicating a set of team priorities for the team, such as one or more priorities of multiple employees of the set of employees, one or more priorities relating to tasks to be completed by the team, or the like. In some implementations, cloud platform 220 may provide a recommendation relating to rewards (e.g., either monetary or non-monetary rewards, such as recognition, promotion, trophies, announcements, etc.) via the team achievement user interface. For example, cloud platform 220 may determine that an employee of the team has a performance impact such that they increase effectiveness of other employees of the team, and may recommend a reward or recognition scheme for the employee based on determining that the employee has demonstrated such a performance impact. In this way, by focusing on contributions of performance to other team members determined to affect team achievement, cloud platform 220 assesses employees of a team in a more comprehensive manner relative to another technique that only utilizes sales figures or performance reviews.

In some implementations, cloud platform 220 may provide, via the team achievement user interface, a set of surveys to assess the set of employees in an ongoing manner and permit cloud platform 220 to provide information via a user interface to permit a supervisor to understand the set of employees. For example, cloud platform 220 may determine a recommendation to reassess a level of engagement of the set of employees of the team to permit a supervisor to understand the level of engagement, and may generate an engagement survey. In this case, cloud platform 220 may cause the engagement survey to be provided for display via the team achievement user interface (e.g., via client device 210), and may store results as updated employee information. Additionally, or alternatively, cloud platform 220 may provide a strengths survey via the team achievement user interface to reassess a set of skills or strengths of the set of employees. In this way cloud platform 220 may reduce a utilization of computing resources by ensuring accurate, up-to-date information, relative to another technique that uses out-of-date information to make subsequent determinations of recommendations for a team.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
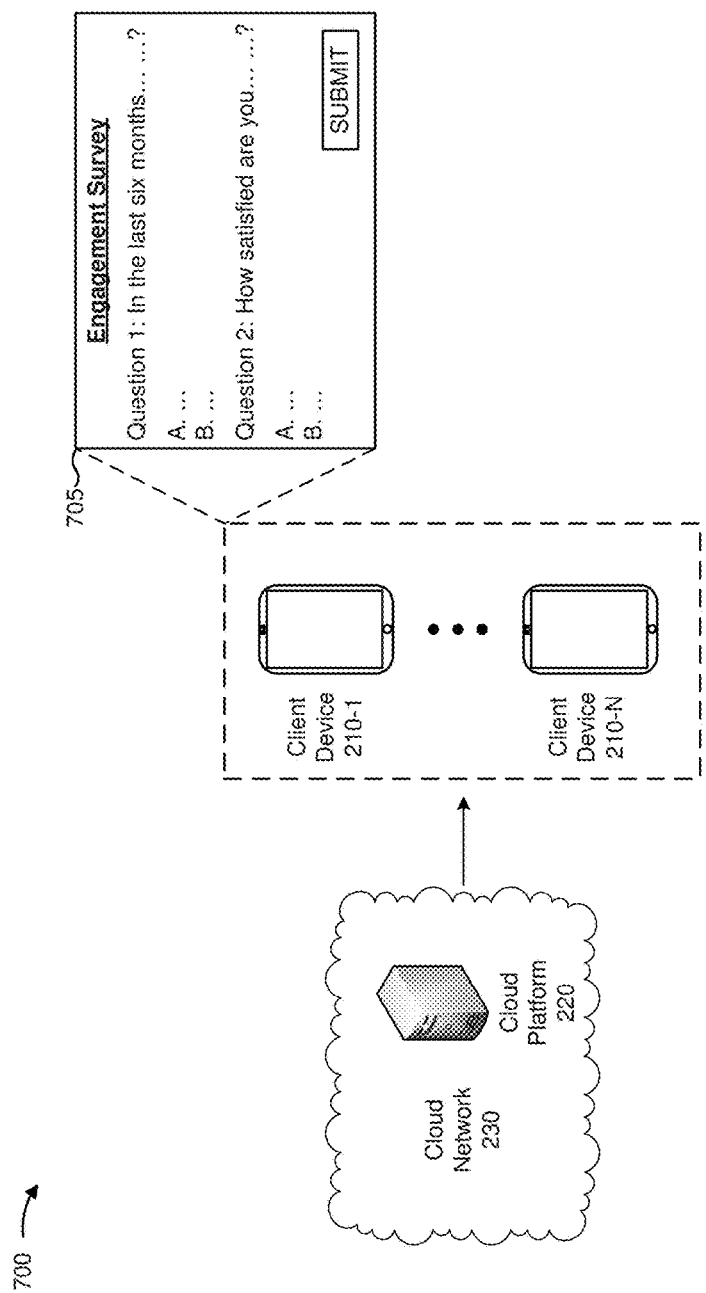
Figure 7B:
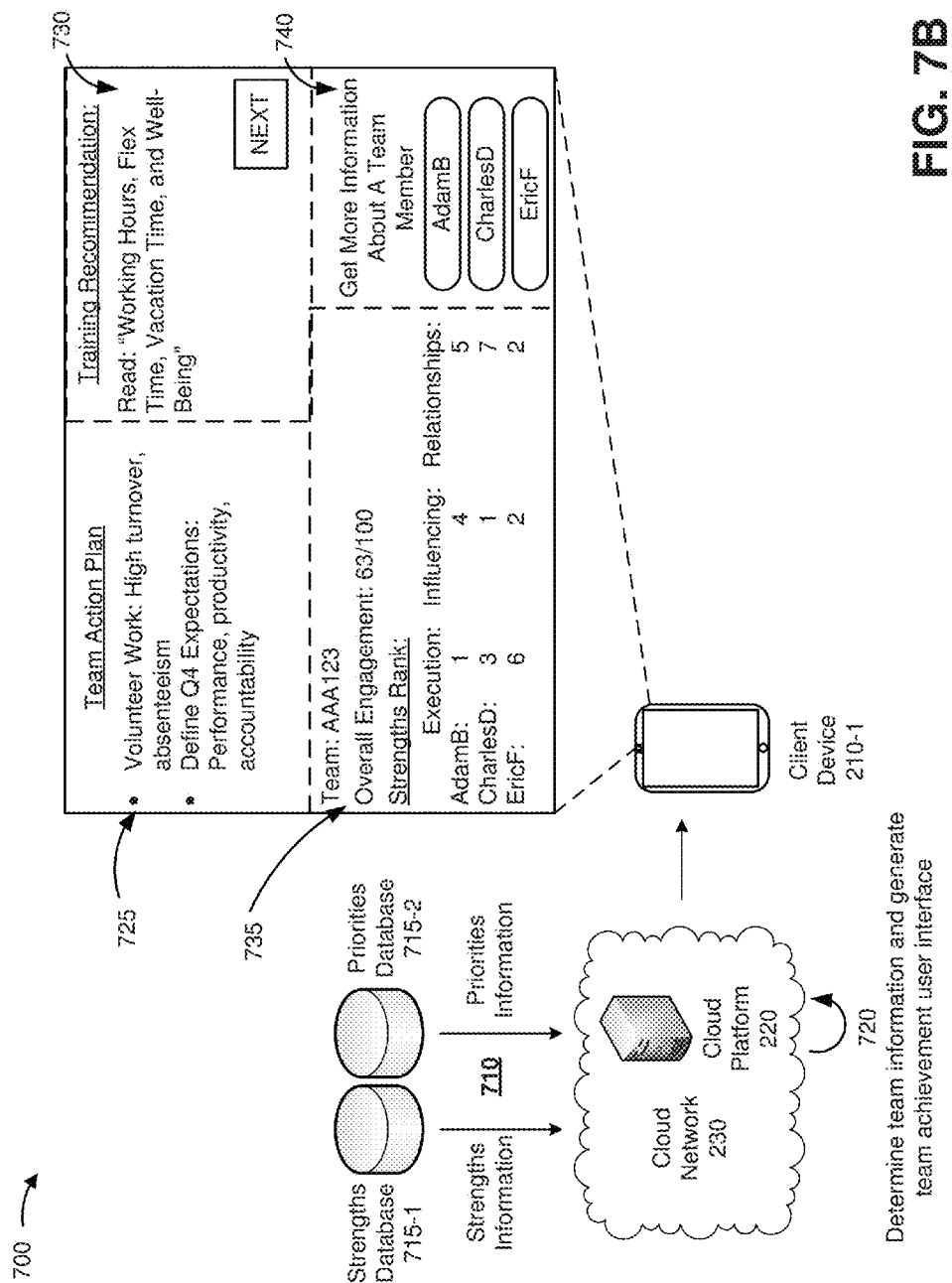

FIGS. 7A-7C are diagrams of an example implementation 700 relating to example process 600 shown in FIG. 6. FIGS. 7A-7C show an example of providing a user interface to enable performance achievement for a team of employees of an organization.

As shown in FIG. 7A, cloud platform 220 provides, via a set of client devices 210, an engagement survey relating to determining engagement levels of a set of employees. For example, cloud platform 220 may select, for display via client device 210-1 to a particular employee, a particular set of prompts regarding engagement of the employee, and may cause the particular set of prompts to be provided for display via user interface 705 of client device 210-1. Based on detecting a set of user interactions with user interface 705 of client device 210-1, cloud platform 220 may receive a set of responses to the particular set of prompts, and may process the set of responses to determine a level of engagement of the particular employee. Assume that cloud platform 220 stores the set of responses for subsequent utilization via a data structure (e.g., an engagement database).

As shown in FIG. 7B, and by reference number 710, cloud platform 220 receives strengths information and priorities from a set of databases 715. For example, cloud platform 220 receives strengths information from strengths database 715-1 and priorities information from priorities database 715-2 regarding a set of employees of a team. As shown by reference number 720, cloud platform 220 determines team information and generates a team achievement user interface including a set of recommendations relating to improving team achievement. For example, cloud platform 220 determines a team action plan including a set of recommendations for the team, a team training recommendation, or the like.

As further shown in FIG. 7B, and by reference number 725, provides, via the team achievement user interface, the team action plan for the team. The team action plan includes a set of recommendations for improving team achievement, such as a recommendation relating to improving engagement and a recommendation relating to improving transparency. The recommendation relating to improving engagement (e.g., Volunteer Work) is provided via the user interface of client device 210-1, and cloud platform 220 provides an indication of a potential benefit of implementing the recommendation relating to improving engagement (e.g., improving a turnover rate and an absenteeism rate of the team). In this way, cloud platform 220 provides information relating to managing a team to reduce a likelihood of attrition and/or to reduce absenteeism, thereby reducing an amount of time to complete tasks, an expense associated with training replacement employees, and a utilization of computing resources associated with completing and/or revising tasks by less skilled and/or newer employees.

As further shown in FIG. 7B, and by reference number 730, cloud platform 220 may provide a training recommendation for a particular employee utilizing client device 210-1 to improve employee engagement and improve performance achievement for the team. For example, cloud platform 220 recommends that the manager view a training program regarding utilization of vacation time and well-being initiatives to improve management of the team. In another example, cloud platform 220 may recommend additional resources be provided to an overworked team to improve engagement of the team. As shown by reference number 735, cloud platform 220 provides information associated with the team, such as information identifying an engagement score for the team, information identifying levels of skill for employees of the team, or the like. In this way, cloud platform 220 ensures that a user of the team achievement user interface is informed regarding strengths of team members, engagement of the team, or the like, thereby improving management of the team and reducing a utilization of computing resources associated with completing and/or revising tasks performed by team members. As shown by reference number 740, cloud platform 220 provides, via the team achievement user interface, one or more user interface elements associated with providing more information regarding an employee of a team to permit a manager to obtain detailed information regarding employees of the team.

As shown in FIG. 7C, cloud platform 220 may provide, via the team achievement user interface, a workflow and guidance document for a representative of an employee to have a talent discussion conversation with an employee of the team to discuss the employee's impact and future growth opportunities. In an example, cloud platform 220 may identify a set of suggested conversation starters relating to priorities, feedback, impact, or the like. In this way, cloud platform 220 facilitates regular talent discussion conversations resulting in personalized talent actions towards ensuring individual performance and team achievement. As another example, cloud platform 220 may provide a consolidated view of representative input on talent actions for all employees for a particular business leader. Cloud platform 220 may provide the business leader the ability to update the personalized talent actions (e.g., to update a promotion, a new skill to learn, a new task to attempt, an action plan for an employee's career, etc.) suggested by a representative of the employee to ensure leadership agreement on how to position each employee for success. As another example, cloud platform 220 provides information regarding team strengths and a team action plan to improve transparency for employees of the team, and provides a user interface element to receive feedback regarding the talent discussion. In this way, cloud platform 220 facilitates group talent discussions to improve individual employee performance achievement, team achievement, or the like.

As indicated above, FIGS. 7A-7C are provided merely as an example. Other examples are possible and may differ from what was described with regard to FIGS. 7A-7C.

FIG. 8 is a flow chart of an example process 800 for providing social channels to assist in performance achievement for a set of employees of an organization. In some implementations, one or more process blocks of FIG. 8 may be performed by cloud platform 220. In some implementations, one or more process blocks of FIG. 8 may be performed by another device or a group of devices separate from or including cloud platform 220, such as client device 210 and/or server 250.

As shown in FIG. 8, process 800 may include receiving employee information and/or team information (block 810). For example, cloud platform 220 may receive employee information and/or team information. In some implementations, cloud platform 220 may receive the employee information and/or the team information based on determining the employee information and/or the team information. For example, cloud platform 220 may determine a skill of an employee based on information identifying a role assigned to the employee and information identifying a set of skills associated with the role, as described herein. Similarly, cloud platform 220 may determine an area of strength of a team based on information identifying a set of skills for a set of employees of the team, as described herein.

In some implementations, cloud platform 220 may receive the employee information and/or the team information based on generating one or more user interfaces including one or more surveys. For example, cloud platform 220 may generate an individual achievement user interface including a priorities questionnaire to determine priorities of an individual, and may detect a user interaction with the individual achievement user interface (e.g., provided via client device 210) associated with indicating a response to a set of prompts of the priorities questionnaire. In this case, cloud platform 220 may determine a set of individual priorities, a set of team priorities, or the like based on the response to the set of prompts of the priorities questionnaire. Similarly, cloud platform 220 may generate a team achievement user interface including an engagement survey, and may detect a user interaction with the team achievement user interface (e.g., provided via client device 210) associated with indicating a response to a set of prompts of the engagement survey. In this case, cloud platform 220 may determine a level of engagement of an employee, a level of engagement of a team, or the like based on the response to the set of prompts of the engagement survey.

As further shown in FIG. 8, process 800 may include determining a personalized social intervention recommendation based on the employee information and/or the team information (block 820). For example, cloud platform 220 may determine the personalized social intervention recommendation based on the employee information and/or the team information. In some implementations, cloud platform 220 may determine the personalized social intervention recommendation based on a level of usage of another user interface, such as an individual achievement user interface, a team achievement user interface, or the like. For example, cloud platform 220 may determine that a user satisfies a threshold level of usage of the team achievement user interface, and may determine to provide a personalized gamification module via the team achievement user interface or another user interface to cause the user to increase a level of usage of the team achievement user interface. In this way, cloud platform 220 may increase a likelihood of employees utilizing a user interface, such as an individual achievement user interface, a team achievement user interface, or the like. This may improve employee performance and/or team achievement relative to another technique that does not include a personalized gamification module, thereby reducing a utilization of computing resources relative to requiring computing resources to be expended to revise poor employee performance.

In some implementations, cloud platform 220 may generate a score relating to an employee, and may determine the personalized social intervention based on the score. For example, cloud platform 220 may determine a score relating to utilization of an individual achievement user interface (e.g., an amount of time elapsed during utilization of the individual achievement user interface). In this case, when the score fails to satisfy a threshold associated with a threshold level of utilization, cloud platform 220 may determine a personalized social intervention recommendation relating to providing one or more social channels to increase the level of utilization. Additionally, or alternatively, cloud platform 220 may determine the score based on a reported user satisfaction with a user interface (e.g., the team achievement user interface), a rate of adoption of recommendations provided via the user interface, a completion percentage of one or more questionnaires provided via the user interface, a participation in coaching sessions established by cloud platform 220 and identified via the user interface, or the like. In this case, cloud platform 220 may determine a personalized social intervention corresponding to a threshold score. For example, for an employee satisfying a first threshold score, cloud platform 220 may establish a social channel to permit communication with a second employee satisfying a second threshold score. Similarly, for an employee satisfying a third threshold score, cloud platform 220 may establish a social channel associated with improving utilization of the user interface, such as a social channel determined, based on employee information, to be of interest to the employee.

In some implementations, cloud platform 220 may determine a personalized social intervention recommendation based on employee information identifying a set of priorities of an employee. For example, cloud platform 220 may process the employee information to determine that a particular priority of a first employee (e.g., to build a new client relationship) relates to a second employee (e.g., a client manager), and may provide a social channel for communicating regarding the particular priority. Additionally, or alternatively, cloud platform 220 may determine that a team priority is achievable by a subset of team members, and may provide a social channel for directing communications of the subset of team members.

In some implementations, cloud platform 220 may generate a personalized social intervention recommendation based on employee information identifying a set of skills or strengths of an employee. For example, cloud platform 220 may determine that a role of first employee of a team requires a skill associated with a second employee of the team. In this case, cloud platform 220 may provide social channel for directing communications between the first employee of the team and the second employee of the team. Additionally, or alternatively, cloud platform 220 may determine that a set of skills of a first employee (e.g., a skill in building relationships) is associated with a threshold likelihood of increasing an engagement level of a second employee, and may provide a social channel to facilitate communication between the first employee and the second employee. Additionally, or alternatively, cloud platform 220 may determine that an employee is associated with a particular strength, and may generate a social recommendation to join a social channel to permit the employee to interact with other employees associated with the particular strength. In this way, the employee may better develop the strength into an asset for personal career goals, performance at work, or the like relative to failing to be put in social contact with similar employees with regard strengths.

In some implementations, cloud platform 220 may process employee information and/or team information using an artificial intelligence technique to generate the personalized social intervention recommendation. For example, cloud platform 220 may process employee information regarding thousands, hundreds of thousands, or millions of employees to generate a set of social communication channels, a set of gamification modules, or the like to improve employee achievement, team achievement or the like. In this case, cloud platform 220 may utilize the artificial intelligence technique to generate information regarding social connections, competitions, likelihoods of implementations being effective at improving performance, or the like. Based on enabling utilization of larger-scale amounts of data regarding employees, cloud platform 220 increases an accuracy of generated social connections, likelihoods, or the like, thereby increasing a likelihood that the personalized social intervention recommendation improves performance. In this way, cloud platform 220 reduces utilization of computing resources relative to another technique that generates inaccurate recommendations and is repeatedly rerun to generate new recommendations to replace the inaccurate recommendations.

In some implementations, cloud platform 220 may identify a social group of employees based on employee information and/or team information. For example, cloud platform 220 may automatically generate a social group based on a priority (e.g., a group associated with achieving a team priority, building a new client relationship, or increasing workplace efficiency), a strength (e.g., a group of motivator employees, a group of influencer employees, a group of executer employees), a level of engagement (e.g., a group of high engagement employees to facilitate mentorship or a group of low engagement employees to receive coaching), or the like.

In some implementations, cloud platform 220 may determine an organizational conversation to provide to the employee. For example, cloud platform 220 may receive information identifying a set of conversations between groups of employees (e.g., a priorities discussion, a strengths discussion, a training discussion, or the like), may determine that a particular conversation is relevant to a particular employee based on employee information or team information (e.g., indicating that the particular employee is associated with a particular priority being discussed). In this case, cloud platform 220 may determine a personalized social intervention associated with causing a social channel including messages of the particular conversation to be provided for display via a user interface to the particular employee, and may provide an alert, via client device 210, indicating that the particular conversation is occurring and/or being provided for display.

Additionally, or alternatively, cloud platform 220 may provide a set of frequently asked questions (FAQs) and associated answers relating to a feature of a user interface (e.g., the individual achievement user interface), based on determining that the set of FAQs and associated answers are of interest or relevant to the particular employee. In some implementations, cloud platform 220 may determine to establish a social channel to discuss the set of FAQs and associated answers.

In some implementations, cloud platform 220 may determine a set of social intervention recommendations periodically. For example, cloud platform 220 may determine to provide a tip for utilizing an individual achievement user interface or a team achievement user interface (e.g., an alert identifying a feature) each day, each week, each month, or the like. In some implementations, cloud platform 220 may determine a set of social intervention recommendations relating to media content. For example, based on monitoring utilization of the individual achievement user interface, cloud platform 220 may determine that a particular user is failing to utilize a particular module of the individual achievement user interface (e.g., viewing strengths, completing a survey, or communicating with colleagues), and may determine to provide an instructional video for display to instruct the user in utilizing the particular module.

In some implementations, cloud platform 220 may determine to provide access to a particular campaign to a particular set of employees based on the individual information and/or the team information. For example, when a supervisor is to perform a question and answer session via a social channel, cloud platform 220 may determine a group of employees to whom the question and answer session is likely to be relevant (e.g., based on employee priorities, team priorities, employee strengths, or team strengths), and may determine to recommend that the user view the question and answer session via a user interface.

In some implementations, cloud platform 220 may determine to provide a gamification module to increase utilization of the personal achievement user interface or the team achievement user interface. For example, based on determining, based on the employee information or the team information, that a particular set of rewards (e.g., points earned based on actions) are associated with a greater utilization of a user interface, cloud platform 220 may determine a personalized social intervention including a gamification module with a set of rewards. In this case, cloud platform 220 may determine to provide the gamification module to a group of employees (e.g., a team) to cause the group of employees to compete to achieve a greater amount of progress toward an individual priority, a team priority, a utilization of a user interface, a participation in group events, acquisition of one or more skills, or the like.

In some implementations, cloud platform 220 may determine a personalized social intervention associated with a training video. For example, cloud platform 220 may determine to cause a training video to be provided to a group of employees via a group of client devices 210, and may provide a social channel to discuss the video. In some implementations, cloud platform 220 may provide an interactive video. For example, based on cloud platform 220 determining that a particular feature (e.g., a priorities identification feature) of the individual achievement user interface is not associated with a threshold utilization by a particular employee, cloud platform 220 may provide an interactive video to permit the particular employee to learn to use the particular feature. In this case, cloud platform 220 may monitor utilization of the individual achievement user interface to alter playback of the video based on a user interaction (e.g., providing a portion of the video relating to a particular user interface element based on a mouse-over of the particular user interface element).

As further shown in FIG. 8, process 800 may include providing a set of social channels via a user interface based on determining the personalized social intervention recommendation (block 830). For example, cloud platform 220 may provide the set of social channels via the user interface based on determining the personalized social intervention recommendation. The set of social channels may refer to a set of modules included in the user interface to implement the personalized social intervention recommendation. For example, cloud platform 220 may provide a chat functionality via a user interface to implement a social intervention recommendation to collaborate with a particular employee. In this case, cloud platform 220 may cause communications to be directed between multiple client devices 210 via one or more social channels established by cloud platform 220. Additionally, or alternatively, cloud platform 220 may provide a gamification module to cause an employee utilizing a user interface to collaborate with one or more other employees.

In some implementations, cloud platform 220 may provide a social channel to share a gamification achievement. For example, cloud platform 220 may cause one or more gamification achievements of a first employee to be provided for display via a user interface (e.g., an individual achievement user interface or a team achievement user interface) to a second employee. In some implementations, cloud platform 220 may generate the user interface to include one or more user interface elements to permit a user interaction associated with providing permission to share the one or more gamification achievements. In some implementations, cloud platform 220 may provide a gamification module in a first user interface to provide information regarding progress of a set of employees (e.g., of a team) toward achievement of one or more priorities (e.g., a set of individual priorities or a team priority).

In some implementations, cloud platform 220 may selectively route communications associated with the set of social channels. For example, cloud platform 220 may identify a set of recipients for a message input into a first user interface based on a content of the message, employee information relating to the set of recipients, or the like, and may cause the message to be provided for display via a second user interface. Additionally, or alternatively, cloud platform 220 may identify a subject associated with a message, such as based on a comment, a hashtag, parsing the message using a machine learning technique, or the like, may determine a recipient of the message based on the subject of the message and employee information regarding employees of the organization, and may route the message for display via a particular user interface based on determining the recipient of the message. In some implementations, cloud platform 220 may route communications based on determining a relevancy or an interest level associated with an employee. For example, based on employee information or team information, cloud platform 220 may determine that an employee is to obtain a particular skill, and may direct communications associated with the particular skill to a client device 210 utilized by the employee.

In some implementations, cloud platform 220 may periodically update information provided via a user interface based on the personalized social intervention. For example, based on information identifying a progress on a task, toward a priority, toward obtaining a skill, or the like, cloud platform 220 may update a gamification module, provide an alert for display, or the like. In some implementations, cloud platform 220 may generate a set of messages for a first employee to provide to a second employee. For example, based on establishing a social channel relating to progress in a gamification module, cloud platform 220 may generate a message of congratulations regarding an achievement of a first employee and may provide the message for display to a second employee. Based on detecting a user interaction with a user interface element of a user interface of client device 210 (e.g., to cause the message of congratulations to be sent), cloud platform 220 may direct the message of congratulations to another client device 210 for display to the first employee. In this way, cloud platform 220 may enable social communication between a set of employees of potentially millions of employees who are determined to have a shared interest, a shared priority, or the like, thereby reducing a likelihood that communications are routed to client devices 210 used by employees not interested in the content of the communications. This reduces a utilization of processing resources and/or network resources, which may be substantial for a large organization, relative to another technique that does not utilize machine learning, artificial intelligence techniques, or the like to generate social channels and include the social channels in user interfaces.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIG. 9 are diagrams of an example implementation 900 relating to example process 800 shown in FIG. 8. FIG. 9 show an example of providing social channels to assist in performance achievement for a set of employees of an organization.

As shown in FIG. 9, cloud platform 220 provides a set of social channels via a set of user interfaces. For example, based on identifying customized social interventions for each employee of a set of employees of a team based on individual information, team information, or the like, cloud platform 220 generates the set of user interfaces (e.g., based on a template, based on dynamically rescaling, or the like, as described herein) to include the set of social channels to be provided via user interfaces of a set of client devices 210 (e.g., via a dedicated user interface or via a portion of another user interface, such as an individual achievement user interface or a team achievement user interface).

As further shown in FIG. 9, and by reference number 910, cloud platform 220 includes, in a team achievement user interface 910 provided for display to a first employee of the team by client device 210-1, a gamification module providing information identifying a progress on a set of team priorities. Cloud platform 220 provides, via team achievement user interface 910, information identifying a reward for completing a priority for the team, completing a peer coaching session with another employee of the team, or the like. Cloud platform 220 provides, via team achievement user interface 910, information identifying a set of gamification awards (e.g., an icon or a badge) for the first employee, an alert relating to the first employee's progress in completing the priority for the team, and a set of social channel recommendations for the first employee, such as a question and answer session (e.g., a link to the question and answer session titled: #Q&A) and a motivational seminar (e.g., a link to the motivational seminar titled: #BeAwesome) that are determined to be of interest to the first employee.

As further shown in FIG. 9, and by reference number 920, cloud platform 220 provides, via a team achievement user interface 920 provided for display to a second employee of the team by client device 210-1, the gamification module providing information identifying the progress on the set of team priorities. Cloud platform 220 provides, via team achievement user interface 920, a user interface element to share information regarding an alert (e.g., an achievement of the second employee). Based on a user interaction with the user interface, cloud platform 220 identifies a group of recipients for the information, and causes the information to be provided for display via a group of user interfaces used by the group of recipients (e.g., other employees). Cloud platform 220, provides, via team achievement user interface 920, information identifying an achievement of a third employee, and a user interface element to cause a message to be transmitted for display via team achievement user interface 930 to the third employee. In this way, cloud platform 220 facilitates social sharing.

As further shown in FIG. 9, and by reference number 930, cloud platform 220 provides, via team achievement user interface 930 provided for display to the third employee via client device 210-3, the gamification module providing information identifying the progress on the set of team priorities. Cloud platform 220 provides, via team achievement user interface 930, a user interface element identifying an assignment of a mentorship program activity to improve performance, an alert regarding completion of a priorities survey (e.g., indicating a particular quantity of gamification points for increasing utilization of an individual achievement user interface), and a new message for a group to which cloud server 220 assigned the third employee (e.g., a group of influencer-type employees based on the third employee being associated with an influencer strength).

As indicated above, FIG. 9 are provided merely as an example. Other examples are possible and may differ from what was described with regard to FIG. 9.

In this way, cloud platform 220 generates an individual achievement user interface, a team achievement user interface, and/or a set of social channels to improve a level of performance of employees of a company. Based on providing information regarding and based on an individual, cloud platform 220 improves an employer or an employee's knowledge of the employee and of attributes correlated with a threshold performance. Based on providing information regarding and based on a team, cloud platform 220 improves team transparency and team performance based on collective contributions of multiple employees to the team. Based on providing a set of social channels, cloud platform 220 improves organizational culture with regard to utilization of the individual and team achievement user interfaces and/or recommendations associated with improving employee and/or team achievement. Based on improving employee performance, cloud platform 220 reduces a utilization of computing resources relative to another technique for employee management that may result in increased training, reduced accuracy of tasks completed, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
communicate with a first server to obtain first information regarding a plurality of groups of entities,
the first information being stored by a plurality of data structures associated with the first server, and
the first information including priorities information identifying a set of goals;
process the first information to generate a data model relating to attributes of the plurality of groups of entities;
communicate with a second server to obtain second information regarding a particular group of entities;
process the second information using the data model to identify a set of recommendations relating to the particular group of entities,
the set of recommendations relating to attributes of the plurality of groups of entities and one or more attributes of the particular group of entities,
the set of recommendations being associated with a set of scores;
select a particular recommendation, of the set of recommendations, based on a corresponding score of the set of scores;
generate a user interface including the particular recommendation based on selecting the particular recommendation; and
communicate with a plurality of client devices to cause the particular recommendation to be provided for display,
the plurality of client devices being selected based on the plurality of client devices being determined to be associated with the particular group of entities.

2. The device of claim 1, where the one or more processors, when processing the first information, are to:
process the first information relating to attributes of individual entities, of the plurality of groups of entities, to determine the attributes of the plurality of groups of entities; and
generate the data model based on processing the first information to determine the attributes of the plurality of groups of entities.

3. The device of claim 1, where the one or more processors, when processing the first information, are to:
determine that the attributes of the plurality of groups of entities are associated with a threshold likelihood of the plurality of groups of entities satisfying a threshold level of performance; and
select the attributes of the plurality of groups of entities from a set of attributes based on determining that the attributes of the plurality of groups of entities are associated with the threshold likelihood of the plurality of groups of entities satisfying the threshold level of performance.

4. The device of claim 1, where the one or more processors, when processing the second information, are to:
determine the set of scores for the set of recommendations based on at least one of:
a likelihood of adoption,
a likelihood of performance improvement,
a schedule availability, or
a cost.

5. The device of claim 1, where the one or more processors, when communicating with the first server to obtain the first information, are to:
communicate with the first server to obtain the priorities information from a first data structure of the plurality of data structures;
communicate with the first server to obtain skills information from a second data structure of the plurality of data structures; and communicate with the first server to obtain engagement information from a third data structure of the plurality of data structures.

6. The device of claim 1, where the one or more processors are further to:
   determine an engagement level for the particular group of entities based on the second information,
      the second information identifying one or more engagement levels for one or more entities of the particular group of entities; and
   where the one or more processors, when communicating with the plurality of client devices, are to:
      communicate with the plurality of client devices to cause information identifying the engagement level to be provided for display.

7. The device of claim 1, where the one or more processors are further to:
   determine a set of skills for the particular group of entities based on the second information,
      the second information identifying one or more skills associated with one or more entities of the particular group of entities; and
   where the one or more processors, when communicating with the plurality of client devices, are to:
      communicate with the plurality of client devices to cause information identifying the set of skills for the particular group of entities to be provided for display.

8. The device of claim 1, where the one or more processors are further to:
   determine to schedule a group discussion relating to the particular group of entities,
      the group discussion being related to the particular recommendation; and
   communicate with the plurality of client devices to cause a calendar entry to be stored via the plurality of client devices for the group discussion.

9. A method, comprising:
   receiving, by a cloud computing device, first employee information for a set of employees of an organization;
   generating, by the cloud computing device, an analytical data model based on the first employee information for the set of employees of the organization,
      the analytical data model relating to a set of skills, a set of priorities, and a set of engagement levels that correspond to performance;
   receiving, by the cloud computing device, second employee information for a particular team of employees of the organization;
   determining, by the cloud computing device, team information for the particular team based on the second employee information for the particular team,
      the team information identifying a set of team skills, a set of team priorities, and a team engagement level for the particular team;
   processing, by the cloud computing device, the team information using the analytical data model to identify a set of recommendations for the particular team;
   generating, by the device, a user interface based on processing the team information to identify the set of recommendations,
      the user interface including information identifying the set of recommendations; and
   providing, by the device, the user interface for display via a client device associated with a particular employee of the particular team.

10. The method of claim 9, further comprising:
    determining, based on one or more skills of one or more employees of the particular team and based on the set of team skills, a particular recommendation relating to causing the particular employee to obtain a particular skill,
       the particular skill not being included in the set of team skills; and
    where providing the user interface comprises:
       providing information identifying the particular skill.

11. The method of claim 9, further comprising:
    determining, based on one or more skills of one or more employees of the particular team and based on the set of team skills, a particular recommendation relating to causing the particular employee to obtain a particular skill,
       the particular skill not being included in the set of team skills; and
    where providing the user interface comprises:
       providing information associated with scheduling a coaching session to discuss the particular skill with the particular employee.

12. The method of claim 11, further comprising:
    providing, via another client device, information identifying a set of topics for discussion during the coaching session for display to another employee in another user interface.

13. The method of claim 9, where generating the analytical data model comprises:
    generating a set of similarity scores identifying a similarity of a set of organizations to the organization based on the first employee information for the set of employees of the organization and third employee information regarding a plurality of employees of the set of organizations;
    selecting a subset of the set of organizations based on the set of similarity scores;
    filter the third employee information to select a subset of the third employee information relating to the subset of the set of organizations; and
    process the subset of the third employee information to generate the analytical data model.

14. The method of claim 13, where processing the subset of the third employee information comprises:
    processing the subset of the third employee information using at least one of:
       a natural language processing technique,
       a machine learning technique,
       a pattern recognition technique, or
       a regression technique.

15. The method of claim 9, further comprising:
    identifying another recommendation relating to improvement to employee performance for an employee of the particular team; and
    providing, via the user interface, information identifying the other recommendation relating to improvement to employee performance for the employee.

16. A non-transitory computer-readable medium storing instructions, the instructions comprising:
    one or more instructions that, when executed by one or more processors, cause the one or more processors to:
       receive employee information for a set of employees of a team;
       identify, based on a set of skills, a set of priorities, and a set of engagement levels included in the employee information and associated with the set of employees of the team, team information for the team, the team information including a set of attributes of the team,
the set of attributes of the team including a group of team skills, a group of team priorities, and a team engagement level;
process the team information to identify a recommendation relating to improving one or more attributes of the set of attributes of the team; and
provide a user interface based on processing the team information to identify the recommendation for the team,
the user interface including information identifying the team information,
the user interface including information identifying a portion of the employee information, and
the user interface including information identifying a team action plan relating to the recommendation.

17. The non-transitory computer-readable medium of claim 16, where the one or more instructions, when executed by the one or more processors, further cause the one or more processors to:
provide, via the user interface, a set of communication channels to cause communications relating to the group of team priorities to be routed to a plurality of employees of the set of employees of the team.

18. The non-transitory computer-readable medium of claim 16, where the one or more instructions, that cause the one or more processors to identify the recommendation, cause the one or more processors to:
identify a training recommendation relating to a team skill that fails to satisfy a threshold level of skill;
identify, based on the employee information for the set of employees, an employee to improve proficiency in a skill corresponding to the team skill; and
where the one or more instructions, that cause the one or more processors to provide the user interface, cause the one or more processors to:
provide information regarding a training program associated with causing the employee to improve proficiency in the skill corresponding to the team skill via the user interface.

19. The non-transitory computer-readable medium of claim 16, where the one or more instructions, that cause the one or more processors to provide the user interface, cause the one or more processors to:
provide, via the user interface, a set of questionnaires relating to the employee information;
receive, after providing the set of questionnaires, information identifying results of the set of questionnaires; and
parse the results of the set of questionnaires to update the employee information; and
update the team information based on updating the employee information.

20. The non-transitory computer-readable medium of claim 16, when executed by the one or more processors, cause the one or more processors to:
determine, based on other team information relating to one or more other teams, that a group of skills of a plurality of employees of another team correspond to a threshold level of performance for the team;
determine, based on the team information, that the set of employees of the team are associated with a first subset of the group of skills and are not associated with a second subset of the group of skills; and
where the one or more instructions, that cause the one or more processors to process the team information to identify the recommendation, cause the one or more processors to:
process the team information to identify the recommendation based on determining that the employees of the team are associated with the first subset of the group of skills and are not associated with the second subset of the group of skills,
the recommendation relating to the second subset of the group of skills.

\* \* \* \* \*